US012365366B1

(12) United States Patent
Kaplan et al.

(10) Patent No.: US 12,365,366 B1
(45) Date of Patent: Jul. 22, 2025

(54) CONTROL INTERFACES FOR AUTONOMOUS LAWN MOWERS

(71) Applicant: Scythe Robotics, Inc., Longmont, CO (US)

(72) Inventors: Matthew Alexander Kaplan, Bellvue, CO (US); Evan Thomas Kaufman, Erie, CO (US); Matthew G. Quick, Erie, CO (US); Davis Thorp Foster, Boulder, CO (US); John Gordon Morrison, Longmont, CO (US); Robert Johnstone McCutcheon, Longmont, CO (US)

(73) Assignee: Scythe Robotics, Inc., Longmont, CO (US)

( * ) Notice: Subject to any disclaimer, the term of this patent is extended or adjusted under 35 U.S.C. 154(b) by 982 days.

(21) Appl. No.: 17/347,421

(22) Filed: Jun. 14, 2021

(51) Int. Cl.
| | |
|---|---|
| *B60W 60/00* | (2020.01) |
| *A01D 34/00* | (2006.01) |
| *A01D 34/64* | (2006.01) |
| *A01D 34/82* | (2006.01) |
| *A01D 75/28* | (2006.01) |
| *B60K 26/02* | (2006.01) |
| *A01D 101/00* | (2006.01) |
| *B62D 51/00* | (2006.01) |

(52) U.S. Cl.
CPC ......... *B60W 60/007* (2020.02); *A01D 34/008* (2013.01); *A01D 34/64* (2013.01); *A01D 34/824* (2013.01); *A01D 75/28* (2013.01); *B60K 26/02* (2013.01); *B60W 60/0053* (2020.02); *A01D 2101/00* (2013.01); *B60W 2300/156* (2013.01); *B62D 51/001* (2013.01)

(58) Field of Classification Search
CPC .... A01D 34/008; A01D 34/64; A01D 34/824; A01D 75/28
See application file for complete search history.

(56) References Cited

U.S. PATENT DOCUMENTS

| | | | | |
|---|---|---|---|---|
| 9,470,305 | B2 * | 10/2016 | Kaskawitz | .......... F16H 59/0278 |
| 9,696,749 | B2 * | 7/2017 | Kaskawitz | ............. G05G 13/00 |
| 11,827,294 | B2 * | 11/2023 | Laurin | ................... A01D 34/69 |
| 2003/0192295 | A1 * | 10/2003 | Busboom | ........... A01D 34/6806 |
| | | | | 56/16.7 |
| 2008/0121491 | A1 * | 5/2008 | Ito | .......................... F16D 23/12 |
| | | | | 192/99 R |
| 2008/0184841 | A1 * | 8/2008 | Blind | ...................... G05G 9/047 |
| | | | | 180/320 |
| 2011/0108335 | A1 * | 5/2011 | Levander | ............. A01D 34/824 |
| | | | | 180/19.3 |
| 2013/0081500 | A1 * | 4/2013 | Helin | ...................... A01D 34/82 |
| | | | | 474/8 |
| 2016/0081267 | A1 * | 3/2016 | Barendrecht | ........ A01D 34/824 |
| | | | | 701/22 |
| 2018/0146617 | A1 * | 5/2018 | Oota | .................... A01D 34/824 |

(Continued)

*Primary Examiner* — Abigail A Risic
(74) *Attorney, Agent, or Firm* — Chang & Hale LLP

(57) ABSTRACT

Techniques and architectures for manually controlling a lawn mower while a user is positioned on or within proximity to the lawn mower are discussed herein. For example, the lawn mower can include a control interface having a handle that the user grips with one or more fingers and a control attached to the handle to receive input from one or more other fingers of the user. The control can include a lever or other element with opposing tabs configured to receive input from fingers of the user.

17 Claims, 22 Drawing Sheets

(56) References Cited

U.S. PATENT DOCUMENTS

| | | | |
|---|---|---|---|
| 2021/0037701 A1* | 2/2021 | Kaskawitz | G05B 19/4155 |
| 2021/0378171 A1 | 12/2021 | Barber et al. | |
| 2022/0232762 A1* | 7/2022 | Peters | B62D 11/183 |
| 2023/0049230 A1* | 2/2023 | Graham | A01D 34/69 |

* cited by examiner

US 12,365,366 B1

CONTROL INTERFACES FOR AUTONOMOUS LAWN MOWERS

BACKGROUND

Autonomous systems rely on various sensor data to perform tasks within an environment. For example, an autonomous device can use data from a camera, navigation system, and/or other sensors to establish a trajectory for the autonomous device to follow. Although autonomous systems often operate in an effective manner to perform various tasks, it may be desirable to operate such systems in a least a partially manual mode where a user controls at least a portion of the system. However, existing manual controls for operating such systems may be imprecise and/or difficult to use. For example, when operating in a manual mode, it may be difficult for a user to sit, stand, or otherwise remain attached to an autonomous device while providing input to control the autonomous device.

BRIEF DESCRIPTION OF THE DRAWINGS

Various examples are depicted in the accompanying drawings for illustrative purposes and should in no way be interpreted as limiting the scope of the disclosure. In addition, various features of different disclosed examples can be combined to form additional examples, which are part of this disclosure. In the figures, the left-most digit(s) of a reference number identifies the figure in which the reference number first appears. Throughout the drawings, reference numbers may be reused to indicate correspondence between reference elements.

DETAILED DESCRIPTION

Figure 1:
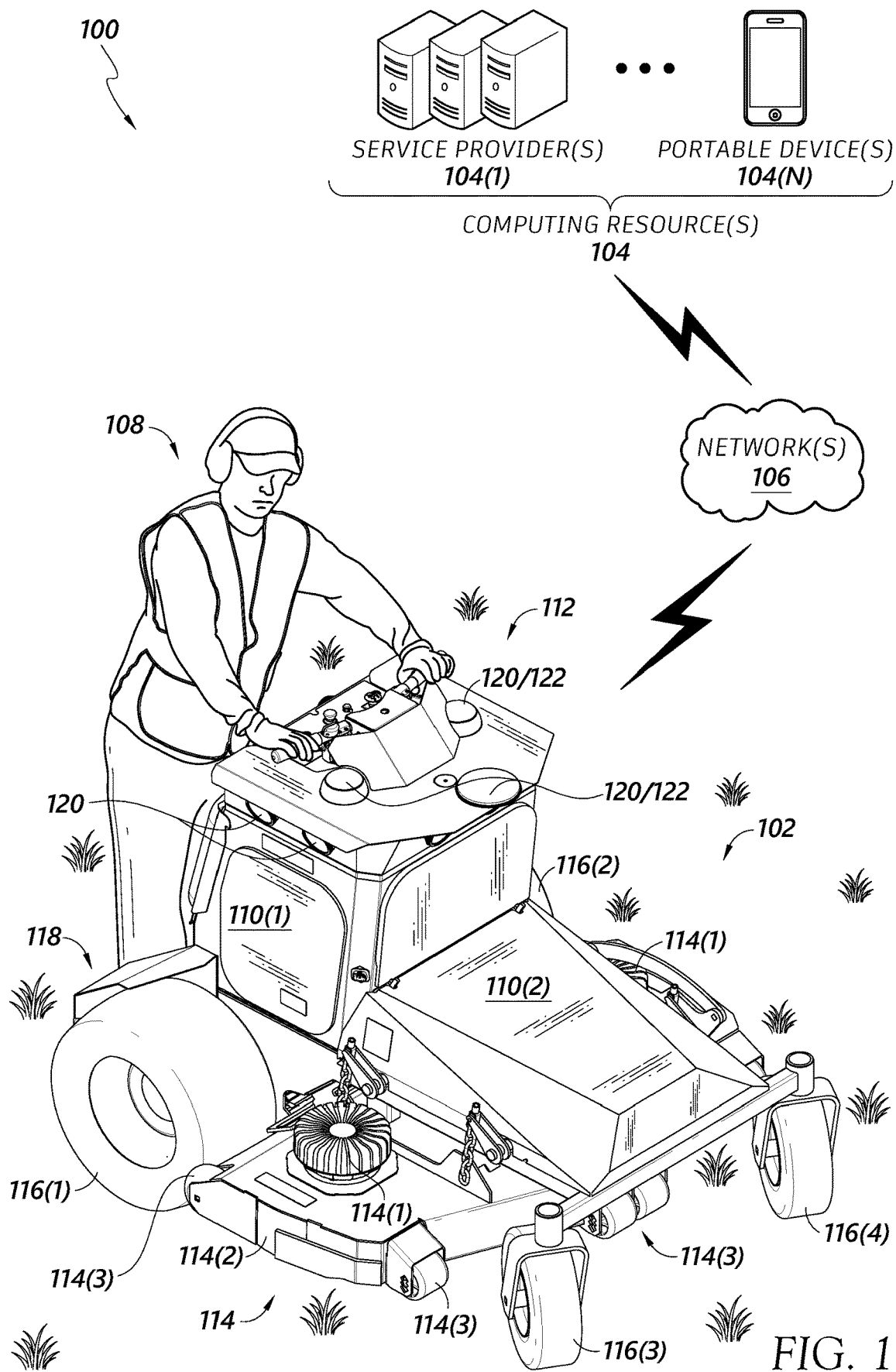
FIG. 1 illustrates an example architecture to implement various techniques/devices discussed herein.

This disclosure describes architectures and techniques for at least partly manually controlling a lawn mower while a user is positioned on or within proximity to the lawn mower. For example, an autonomous lawn mower can implement a manual mode and/or semi-autonomous mode to facilitate manual operation of the lawn mower by a user in instances where an autonomous mode is not desired, or where portions of the autonomy are engaged, respectively. The lawn mower can include features that are ergonomically designed and/or positioned to enable a user to provide input while the user stands, sits, or is otherwise positioned on or within proximity to the lawn mower. In examples, the features discussed herein can allow the lawn mower to be safely and effectively operated in at least a partly manual mode, such as by allowing the user to maintain stability/connection to the lawn mower while providing input to control the lawn mower.

For example, a lawn mower can include a control interface having a handle that a user grips with one or more fingers and an input control (sometimes referred to as "a finger control") attached to the handle to receive input from one or more other fingers of the user. The input control can include a lever or other element with opposing tabs configured to receive input from fingers in an opposable manner. For instance, the input control can be positioned relative to the handle such that the user can grip the handle with the little finger, ring finger, and/or little finger, while the user provides input via the input control using the thumb and/or index finger. In particular, the user can apply a force with the user's thumb to cause the input control to move in a direction and apply a force with the user's index finger to cause the control to move in an opposite direction.

The input control can be configured to control various aspects of the lawn mower. For example, the input control can control the speed of the lawn mower, wherein actuating the input control to a particular position causes the lawn mower to travel at a particular speed. In some cases, the control interface includes multiple controls to facilitate independent operation of multiple wheels of the lawn mower. To illustrate, the control interface can include a right input control for the user's right hand and a left input control for the user's left hand, wherein input received via the right input control can control a speed of a right wheel of the lawn mower and input received via the left input control can control a speed of a left wheel. However, an input control can be configured/reconfigured to implement different actions, such as to control a speed of both wheels (instead of independently controlling the wheels), to control a blade assembly (e.g., to raise/lift the blade assembly, to change a speed of blade(s) of the blade assembly, etc.), and/or to control other aspects of the lawn mower. Further, in another example, a first input control can control a speed of the lawn mower while a second input control can control turning (e.g., a speed of one wheel relative to the other, a wheel that facilitates steering, etc.), Moreover, the control interface can include other controls to control other components of the lawn mower, as discussed in further detail below.

In examples, the techniques and architectures are discussed herein in the context of autonomous systems, such as an autonomous lawn mower, wherein the autonomous systems can include a manual/co-robotics mode that enables a user to provide input to control one or more aspects of the autonomous systems. For instance, a user may operate an autonomous lawn mower in a manual mode to define a boundary that will be used by the lawn mower to mow an area in an autonomous mode. Further, the user can operate the autonomous lawn mower in a manual mode to mow areas that are difficult to mow in an autonomous mode and/or to perform other actions that may be more efficient in a manual mode. In examples of a manual/co-robotics mode, a lawn mower can receive input from a user and/or perform at least some autonomous operations, such as by using sensor data. Although various examples are described in the context of autonomous systems, the techniques and architectures can be implemented in other types of systems, such as non-autonomous devices.

Further, although example lawn mowers are discussed herein, the techniques and architectures can be implemented for other types of equipment/devices, such as other landscaping equipment (e.g., autonomous weedwhackers, trimming devices, edgers, irrigation/watering/sprinkler systems, etc.), excavation equipment, and so on.

Various techniques/devices discussed herein can be implemented in the context of techniques/device discussed in U.S. patent application Ser. No. 16/891,281, filed Jun. 3, 2020, and entitled "Control Interface for Autonomy," the entire contents of which are incorporated herein by reference.

FIG. 1 illustrates an example architecture 100 in which the techniques/devices described herein may be implemented. The architecture 100 includes a lawn mower 102 configured to communicate with one or more computing resources 104 (also referred to as "the computing resource 104") via one or more networks 106 (also referred to as "the network 106"). The lawn mower 102 and/or the computing resource 104 can individually and/or collectively perform various operations discussed herein. For example, the lawn mower 102 can perform operations locally with or without the assistance of the computing resource 104. The computing resource 104 can be local to the lawn mower 102 and/or remote from the lawn mower 102. The one or more networks 106 can include one or more personal area networks (PAN), local area networks (LANs), wide area networks (WANs), Internet area networks (IANs), cellular networks, the Internet, etc. Although example devices are illustrated in the architecture 100, any of such devices may be eliminated/not implemented. In one example, the lawn mower 102 can implement various techniques discussed herein without communicating with the computing resource 104.

The computing resource 104 can be implemented as one or more computing devices. For example, the computing resource 104 can include one or more service providers 104(1) that include one or more computing devices, such as one or more servers, one or more desktop computers, one or more laptops computers, or any other type of device configured to process data. In some examples, the one or more computing devices of the one or more service providers 104(1) are configured in a cluster, data center, cloud computing environment, or a combination thereof. In some examples, the one or more computing devices are implemented as a remote computing resource that is located remotely to the lawn mower 102. In other examples, the one or more computing devices are implemented as local resources that are located locally near and/or a component of the lawn mower 102. Alternatively, or additionally, the computing resource 104 can include one or more portable devices 104(N), such as one or more laptops computers, smartphones, electronic reader devices, mobile handsets, personal digital assistants, portable navigation devices, portable gaming devices, tablet computers, wearable devices (e.g., a watch), portable media players, or other types of portable computing devices. Further, the computing resource 104 can include other types of computing devices, such as one or more desktop computers, televisions, set-top boxes, cameras, security systems, home-based computer systems, projectors, and so on.

The lawn mower 102 can be configured to operate in various modes/states, such as a manual mode/state, an autonomous mode/state, a remote-control mode/state, and/or another operating mode/state, which can be set by a user and/or the lawn mower 102. In a manual mode, the lawn mower 102 can generally operate based on input from a user/operator 108 while the user 108 is positioned on and/or within proximity to the lawn mower 102. For example, the user 108 can be positioned on the lawn mower 108 (as illustrated in FIG. 1) and provide input to navigate the lawn mower 102 and/or control various components of the lawn mower 102. In some examples of implementing a manual mode, the lawn mower 102 can use data from one or more sensors to assist in driving and/or overriding input from the user 108. In some instances, such manual mode can be referred to a co-robotics mode/co-robotics manual mode, since some aspects are controlled by a user and some aspects are controlled autonomously. In an autonomous mode, the lawn mower 102 can generally operate based on data from one or more sensors (and based on relatively little or no human input). In some cases, the lawn mower 102 can be referred to as the autonomous lawn mower 102 since the lawn mower 102 is capable of being operated in an autonomous mode. In a remote-control mode, the lawn mower 102 can operate based on user input from a user that employs the computing resource 104. For example, a user can implement the portable device 104(N) to navigate the lawn mower 102 and/or control various components of the lawn mower 102. The user can be located locally, such as within sight of the lawn mower 102, or remotely, such as out-of-sight of the lawn mower 102 at a remote location.

In some cases, the user 108 can operate the lawn mower 102 in a manual mode to set up or otherwise establish an area for the lawn mower 102 to mow in an autonomous mode.

For example, the user 108 can manually control the lawn mower 102 (as illustrated in FIG. 1) to define a perimeter of an area to be mowed, and thereafter, transition the lawn mower 102 to an autonomous mode to mow the area. Further, in some cases, the user 108 can operate the lawn mower 102 in a manual mode to navigate/mow an area that is difficult/inefficient to navigate/mow in an autonomous mode, such as a relatively small grass section in a parking lot or other environment, areas including obstacles that are difficult to navigate around, and so on. Moreover, the user 108 can operate the lawn mower 102 in a manual mode in other instances.

In one or more of the modes, the lawn mower 102 can generate signals/control signals to control, for example, a speed for the lawn mower 102, a torque to be applied to a wheel(s), a braking of a wheel(s), a steering angle, steering angle rate, a blade height, a blade speed for a blade, etc. For example, in a manual mode, the lawn mower 102 can receive input from a user and generate signals to control the lawn mower 102, while in an autonomous mode the lawn mower 102 can generate signals to control the lawn mower 102 based at least in part on sensor data received.

Figure 2A:
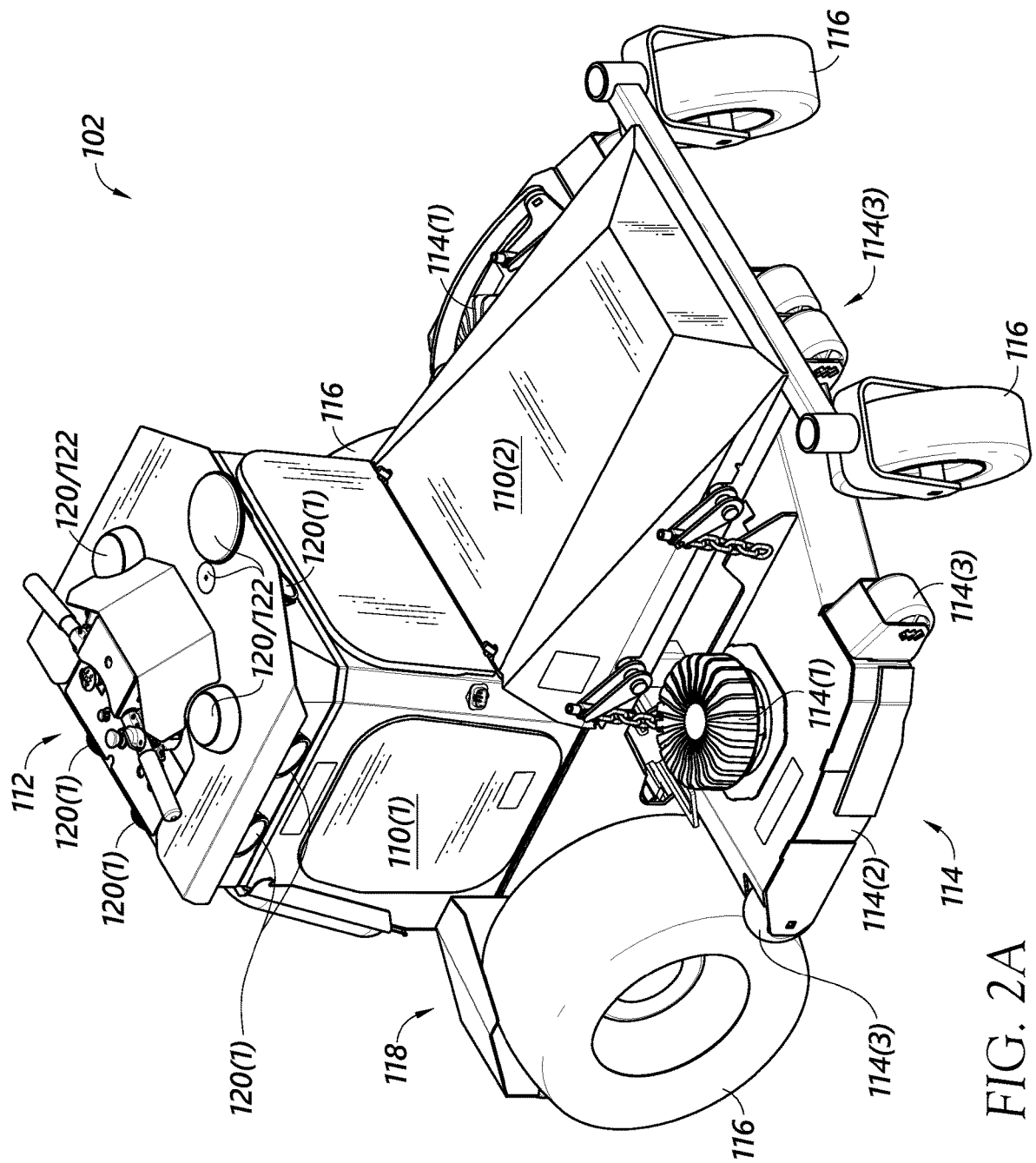
FIG. 2A illustrates a perspective view of the lawn mower of FIG. 1.
Figure 2B:
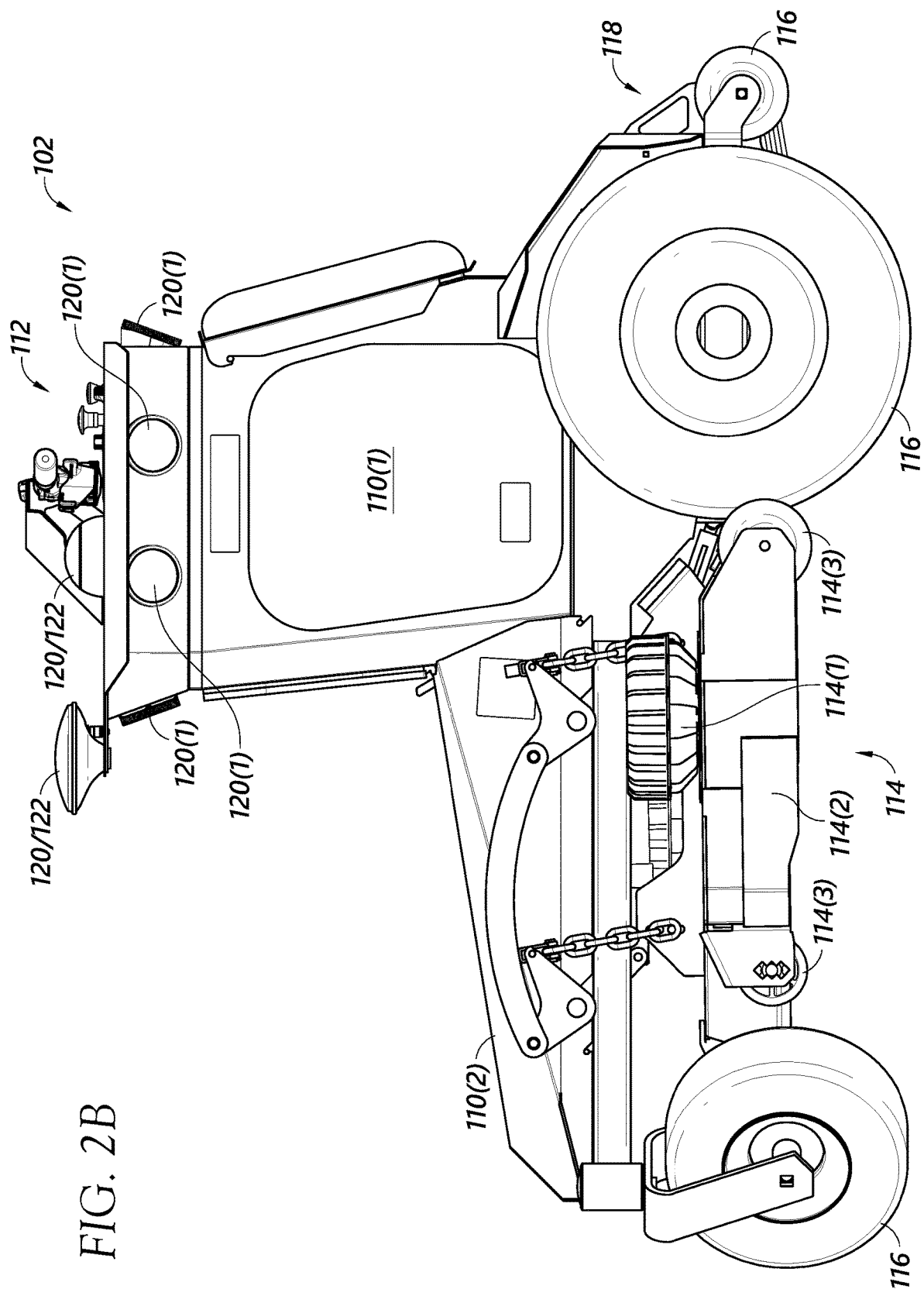
FIG. 2B illustrates a side view of the lawn mower of FIG. 1.
Figure 2C:
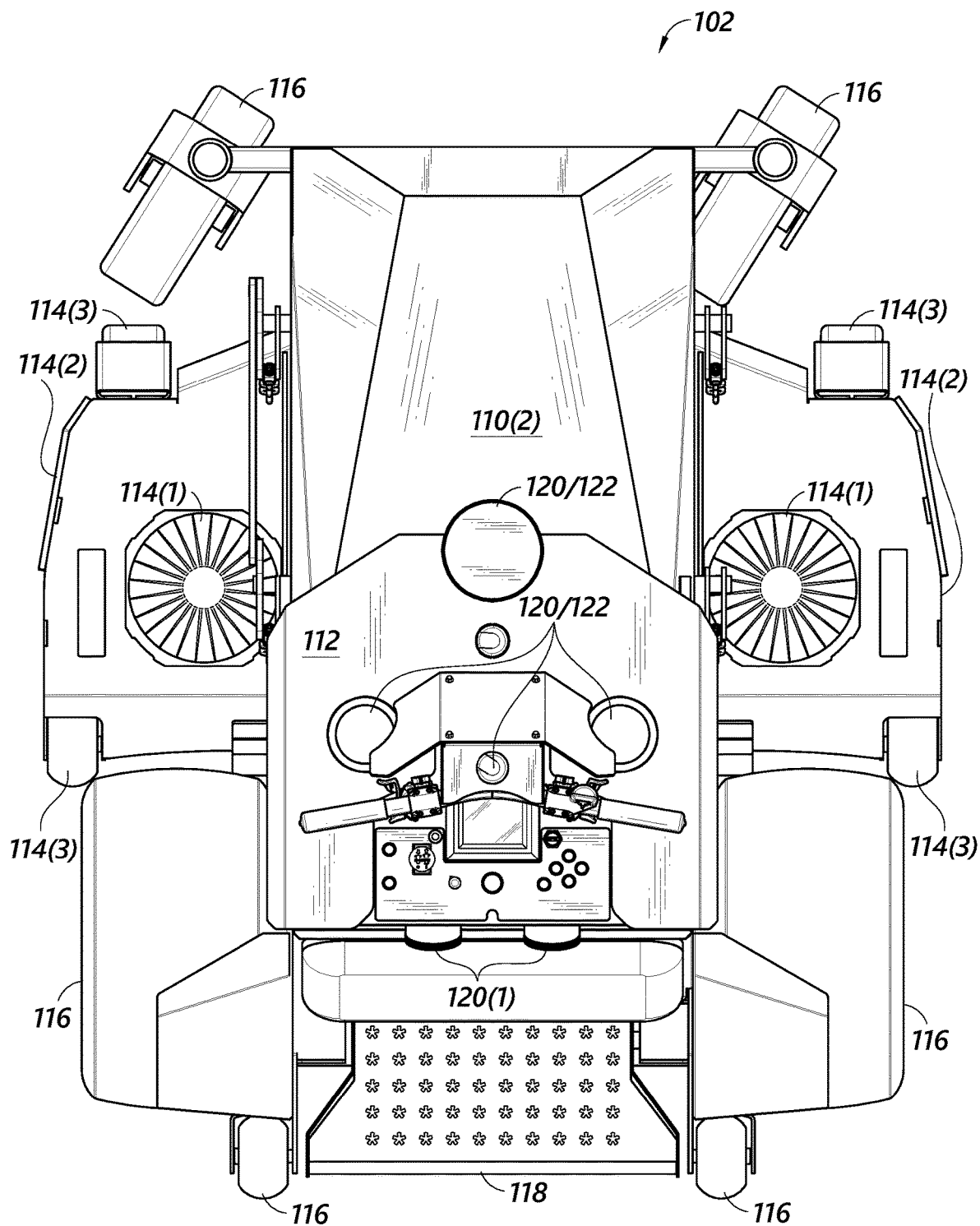
FIG. 2C illustrates a top view of the lawn mower of FIG. 1.

As shown in FIGS. 1 and 2, the lawn mower 102 can include a frame/housing structure 110 configured to attach/couple to one or more components. For example, the lawn mower 102 can include a control interface 112 configured to receive and/or provide output to the user 108, a blade/cutting assembly 114 configured to cut grass or other surface/objects, wheels 116 configured to drive/navigate the lawn mower 102, a platform 118 (shown in more detail in FIG. 2C) for the user 108 to stand/sit on, one or more sensors 120, one or more communication devices/interfaces 122, and/or other components discussed herein. Elements labeled 120/122 in the figures indicate that the element can be a sensor and/or communication device. The frame/housing structure 110 can include, among other things, a tower/vertical portion 110(1) (also referred to as "the podium 110(1)") and a hood/horizontal portion 110(2). In some instances, the tower/vertical portion 110(1) houses one or more computing resources, storage resources, power units, sensors, and/or other components for the lawn mower 102 (which may be more sensitive to environmental conditions). However, one or more of components of the lawn mower 102 can be distributed differently in the tower/vertical portion 110(1) and/or the hood/horizontal portion 110(2).

The control interface/panel 112 can be disposed at a top of the tower/vertical portion 110(1) (also referred to as "the tower structure 110"). The control interface 112 can include one or more input/output (I/O) devices (also referred to as "one or more input controls") to interface with the user 108, such as to receive input from the user 108 and/or provide output to the user 108. The control interface 112 can also include one or more features to assist in stabilizing the user 108 while the user 108 operates the lawn mower 102, such as from a standing position on the back of the lawn mower 102, as illustrated in FIG. 1. In some cases, the control interface 112 is removable/detachable from the lawn mower 102, while in other cases the control interface 112 is fixed/integral with the rest of the frame structure 110.

The blade assembly/deck 114 can include one or more blades/cutting elements (not illustrated) configured to cut grass or other objects to a relatively even height relative to a ground surface. In some cases, a blade is operated in a revolving manner around an axis, while in other cases a blade is implemented in a back-and-forth manner and/or another manner. The blade assembly 114 can include one or more actuators to control rotation/movement of the blades and/or to raise/lower the blade assembly 114/blades relative to a ground surface. The blades can be driven independently or in a cooperative manner using one or more motors 114(1). Further, the blades can be driven independently of an actuator/motor that drives the lawn mower 102, such that a speed of the blades and a speed of the lawn mower 102 can be independently controlled (e.g., the speed of the lawn mower 102 can be adjusted without affecting the rotational speed of the blades). The blade assembly 114 can also include a housing/guard 114(2) configured to protect users or other objects from contacting the blades, such as on the top and sides of the blades. Further, the blade assembly 114 can include wheels 114(3) to assist in moving the blade assembly 114 over a surface when the blade assembly 114 is in a lowered/operating state.

The one or more wheels 116 can be controlled to propel the lawn mower 102 over a surface. In this example, the wheels 116(1) and 116(2) are implemented as the drive wheels for the lawn mower 102, wherein torque is applied to the wheels 116(1)/116(2) to drive the lawn mower 102. The wheels 116(1)/116(2) can be independently or cooperatively operated to move the lawn mower 102, which can include applying different amounts of torque to the wheels 116(1) and 116(2). Here, the wheels 116(2) and 116(3) are implemented as casters/un-driven wheels. Although a particular number of wheels are illustrated in this example, the lawn mower 102 can include any number of wheels, with any number of the wheels being drive wheels. Further, the wheels 116 can be implemented with other mechanisms, such as tracks or other movement members.

The platform 118 can include a plate or other structure for a user to stand/sit while controlling the lawn mower 102 using the control interface 112, as shown in FIG. 2C. In this example, the platform 118 is attached to the frame structure 110 in a fixed manner. However, the platform 118 can be coupled to the frame structure 110 with a coupling/linkage that allows the platform 118 to be moved at least somewhat freely/independently of the frame structure 110. For example, the platform 118 can be disposed/positioned a distance behind the rest of the lawn mower 102 on a set of wheels with a linkage/coupling that connects the platform 118 to the rest of the frame structure 110. Here, the platform 118 can be pulled behind the lawn mower 102. One example of such configuration is illustrated in U.S. patent application Ser. No. 16/891,281, filed Jun. 3, 2020, and entitled "Control Interface for Autonomy."

The one or more sensors 120 can be configured to detect one or more conditions/events/features relating to an environment. In examples, the one or more sensors 120 can comprise one or more image sensors 120(1) (e.g., RGB cameras, monochrome cameras, stereo cameras, depth cameras/sensors, infrared cameras, ultraviolet cameras, RGB-D cameras, IR cameras, etc.), inertial measurement units (IMUs), radar, lidar, accelerometers, gyroscopes, magnetometers, satellite-based navigation system (e.g., Global Navigation Satellite System (GNSS), such as global positioning system (GPS)), ultrasonic transducers (e.g., SONAR), wheel encoders, thermal imagers, ambient light sensors, time-of-flight sensors, barometers, bolometers, pyrometers, proximity sensors (which can include image sensors, in some cases), pressure sensors, and so on. In examples, two or more image sensors 120(1) can have differing fields of view (e.g., wide and narrow) and/or have an associated baseline. In this example, multiple image sensors 120(1) are positioned at the top of and around the vertical portion 110(1). Environment features, including depth estimates, can be determined based on multi-view geometry techniques of sensor data from the multiple image sensors and/or otherwise provided with depth sensors provided. In some instances, a proximity/pressure sensor is disposed in the control interface 112, such as within a handle, input control assembly, etc. to determine if a user is gripping the lawn mower 102. Further, in some instances, a proximity/pressure sensor can be disposed in the platform 118 to detect if the user is operating the lawn mower 102. The one or more sensors 120 can be disposed about the lawn mower 102 at various poses (i.e., position and/or orientations) determined to optimize a field of view, such as at various locations on the frame/housing structure 110, blade assembly 114, wheels 118, control interface 112, and so on. Although the figures illustrate sensors 120 located at particular locations, the sensors 120 can be positioned at other locations on the lawn mower 102. Moreover, additional sensors can be positioned on the lawn mower 102 that those illustrated.

The one or more communication devices/interfaces 122 can be configured to communicate over one or more wireless/wired networks. For example, the one or more communication devices/interfaces 122 can include communication circuitry, antennas, and/or other components configured to send/receive data in a wireless or wired manner over the one or more networks 106. In some examples, the one or more communication devices 122 can implement a wireless technology, such as Bluetooth, Wi-Fi, near field communication (NFC), or the like. In various examples, the lawn mower 102 may comprise a plurality of communication devices 122 having differing modes (e.g., one or more cellular antennas and one or more Wi-Fi antennas).

Figure 3A:
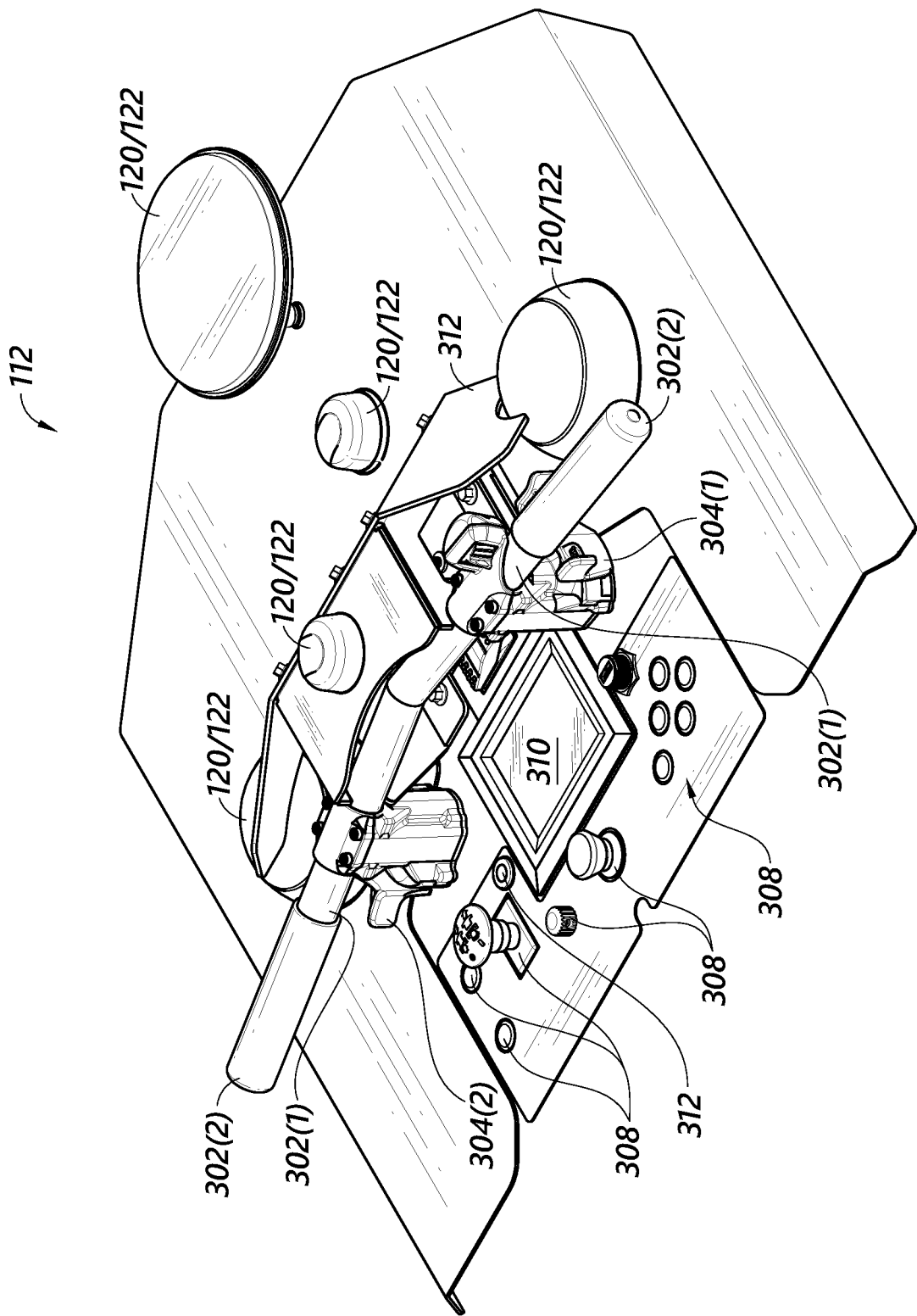
FIG. 3A illustrates a perspective view of a control interface of the lawn mower of FIG. 1.
Figure 3B:
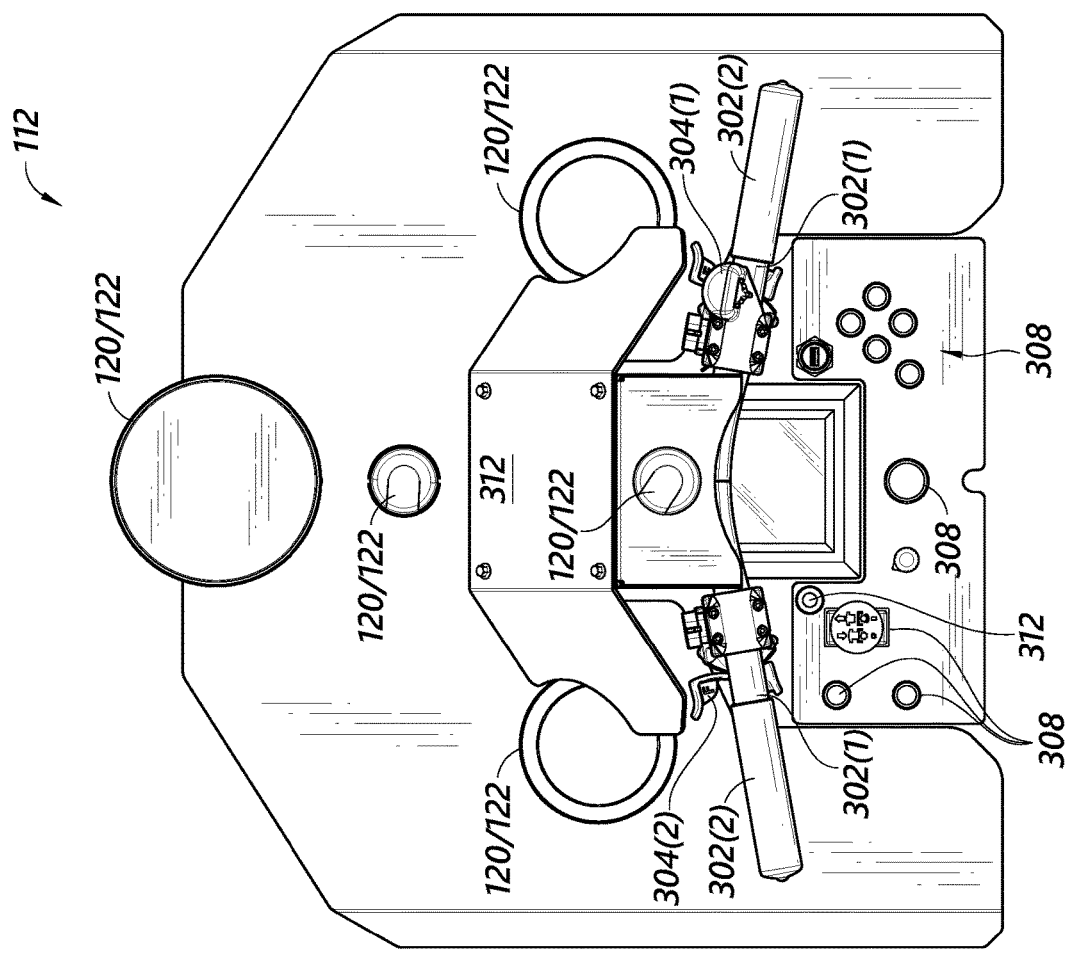
FIG. 3B illustrates a top view of a control interface of the lawn mower of FIG. 1.

FIGS. 3A and 3B illustrate examples details of the control interface 112. Here, the control interface 112 includes a handle 302 (also referred to as "the handlebar 302") having one or more shafts/elongate members 302(1) and one or more grips 302(2) where a user can grasp/hold the one or more shafts/elongate members 302(1). In some cases, the handle 302 can include a bent shape/form to provide a more optimal form for the user to grip the handle 302. For instance, as illustrated from a top view of the control interface 112 in FIG. 3B, a longitudinal axis of a right portion of the handle 302 may not be coaxially aligned with a longitudinal axis of a left portion of the handle 302.

The control interface 112 can also include input controls assemblies 304 (sometimes referred to as "the input controls 304") attached/coupled to the handle 302 and configured to receive input from a user, such as one or more fingers of the user. In this example, the input control assemblies 304 include a right-hand control assembly 304(1) for a right hand of the user and a left-hand control assembly 304(2) for a left hand of the user. In some instances, the right-hand control assembly 304(1) controls a speed/velocity of a right drive/steering wheel 116(1) of the lawn mower 102, while a left-hand control assembly 304(2) controls a speed/velocity of a left drive/steering wheel 116(2) of the lawn mower 102. However, the lawn mower 102 can be configured in other manners such that the input control assemblies 304 cause other actions to be performed. The input controls 304 can extend in a direction towards an upper surface of the control interface 112 to provide a comfortable position for the user to interface with the input controls 304, such as with a thumb and/or index finger, while the user grips the handle 302, such as with a middle finger, ring finger, and/or little finger.

The control interface 112 can also include one or more additional input/output (I/O) devices (including I/O devices 308), such as one or more displays 310, buttons, microphones, speakers, microphones, keyboards, joysticks, mice, touch pads, wearable devices (e.g., optical head-mounted display), and so on. The one or more I/O devices can be configured to receive touch, speech, gesture, or any other type of input. The I/O devices can be configured to receive input to, among other things, adjust a height of the blade assembly 114, start/stop the blades of the blade assembly 114, adjust a speed of the blades, set a mode or/state of the lawn mower 102 (e.g., a drive/operating mode), navigate within a user interface (e.g., a graphical user interface displayed via the display(s) 310), turn the lawn mower 102 on/off, designate whether the lawn mower 102 should operate within a manual, semi-manual, or autonomous mode, pause operation, and/or facilitate various other functionality. A drive mode can include an autonomous/smart mode, a manual mode, a remote-control mode, or another mode in which the lawn mower 102 can be driven/operated. Further, a drive mode can include drive status/states of park, neutral, drive, and so on. In examples, the control interface 112 can include one or more output devices, such as a light or speaker, to provide a visual/audible indicator of a state/mode of the lawn mower 102.

The one or more displays 310 can be configured to display data associated with certain aspects of the present disclosure. For example, the one or more displays 310 can be configured to present a graphical user interface (GUI) to facilitate operation of the lawn mower 102. The one or more displays 310 can include a liquid-crystal display (LCD), a light-emitting diode (LED) display, an organic LED display, a plasma display, an electronic paper display, or any other type of technology. In some examples, the one or more displays 310 include one or more touchscreens and/or other user input/output (I/O) devices.

Furthermore, the control interface 112 can include a guard/housing 312 to protect one or more of the components of the control interface 112, such as the input controls 304, the I/O devices 308, the display 310, etc. Although the control interface 112 is illustrated with various types of components (some of which may not directly interface with a user, such as the communication device(s) 122), the control interface 112 can include/refer to I/O components that directly interface with a user, in some cases.

FIGS. 4A-4F illustrate examples details of the right-hand input control assembly 304(1) (sometime referred to as "the control assembly 304" in FIGS. 4A-4F for convenience). The details of the right-hand control assembly 304(1) can also be representative of details of the left-hand control assembly 304(2), although arranged/formed in an opposing manner to facilitate operation by a left-hand instead of a right-hand.

The input control assembly 304 can include a lever 402 configured to interface/engage with one or more fingers of a user to receive input. The lever 402 can include a first tab/control 402(1) configured to be manipulated by a first finger of a user (e.g., an index finger) to cause the lever 402 to move in a first direction (e.g., clockwise/backwards). Further, the lever 402 can also include a second tab/control 402(2) configured to be manipulated by a second finger of the user (e.g., thumb) to cause the lever 402 to move in a second direction (e.g., counterclockwise/forward). As shown, the tabs 402(1)-(2) can be disposed/arranged in an opposing manner to facilitate, for example, use of the tabs 402(1)-(2) by an index finger and a thumb. The tabs 402 (1)-(2) can be spaced a distance apart from each other, in some cases. In one example, rotating the lever 402 in a clockwise direction (e.g., with an index finger) can cause the lawn mower 102 to move in a forward direction (e.g., cause the wheel 116 associated with the input control assembly 304 to rotate in a forward direction). In contrast, rotating the lever 402 in a counterclockwise direction (e.g., with a thumb) can cause the lawn mower 102 to move in a reverse direction (e.g., cause the wheel 116 associated with the input control assembly 304 to rotate in a reverse direction). However, the lawn mower 102 can be configured to operate in other manners.

Figure 4A:
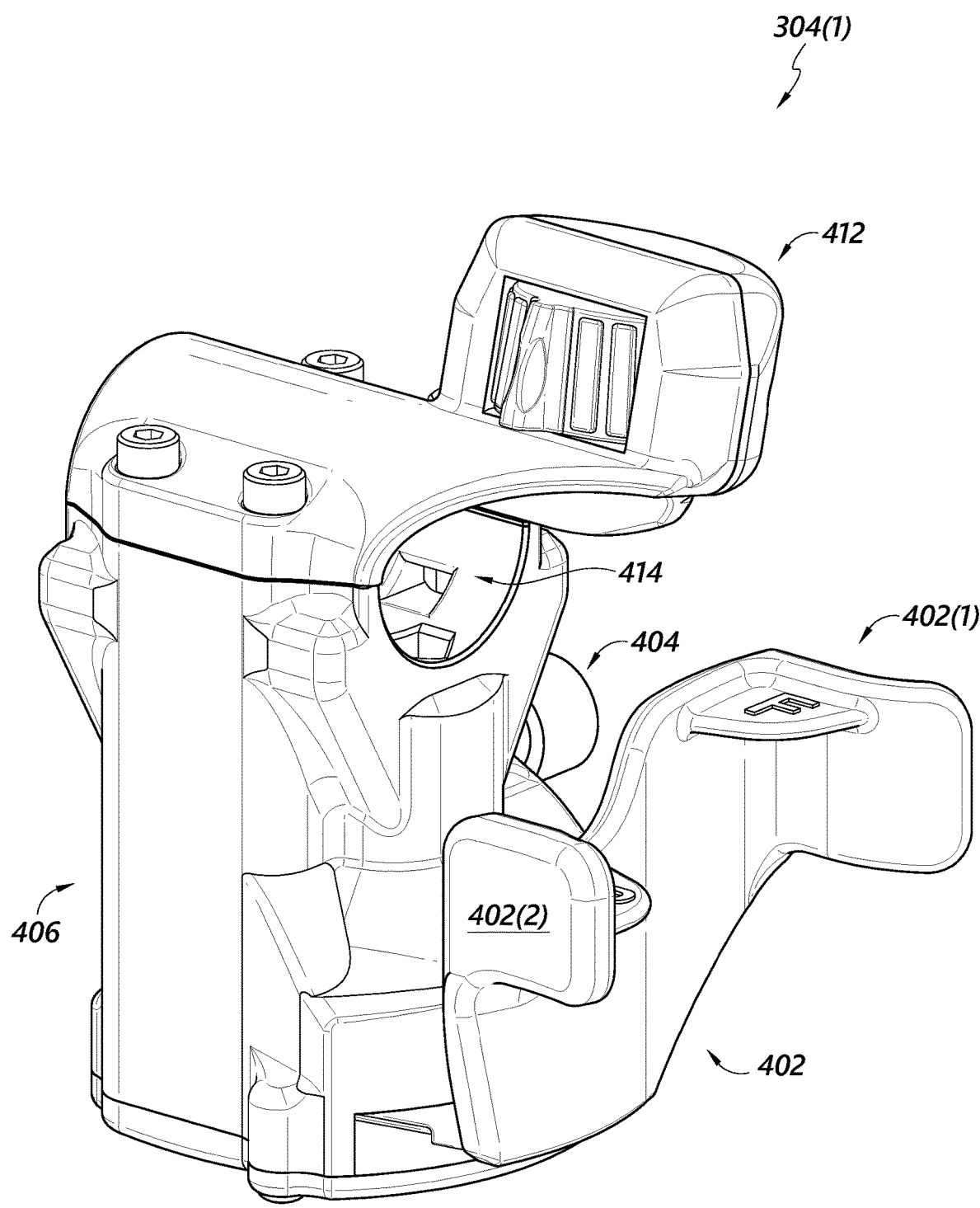
FIG. 4A illustrates a perspective view of an input control assembly of the lawn mower of FIG. 1.
Figure 4B:
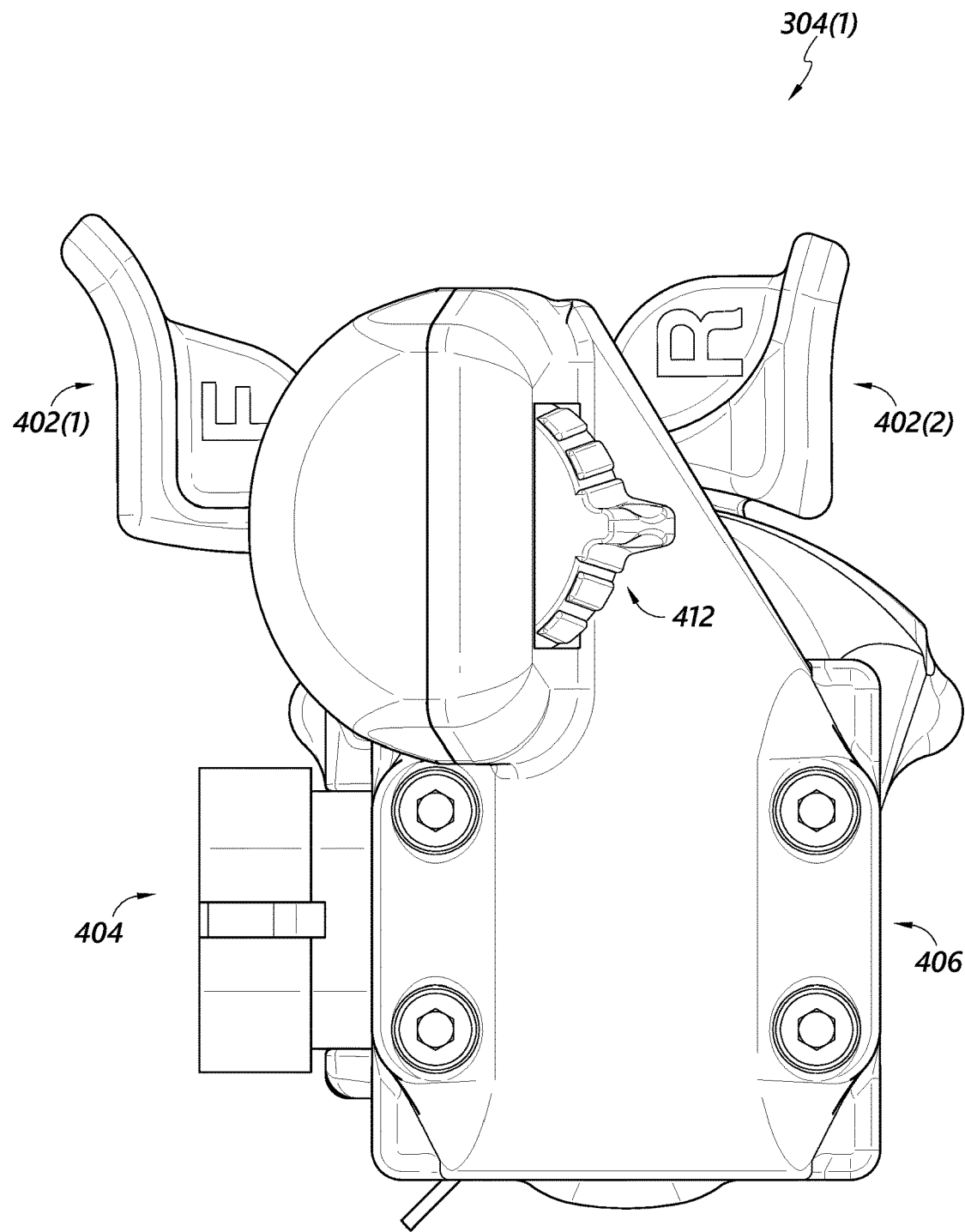
FIG. 4B illustrates a top view of the input control assembly of the lawn mower of FIG. 1.
Figure 4C:
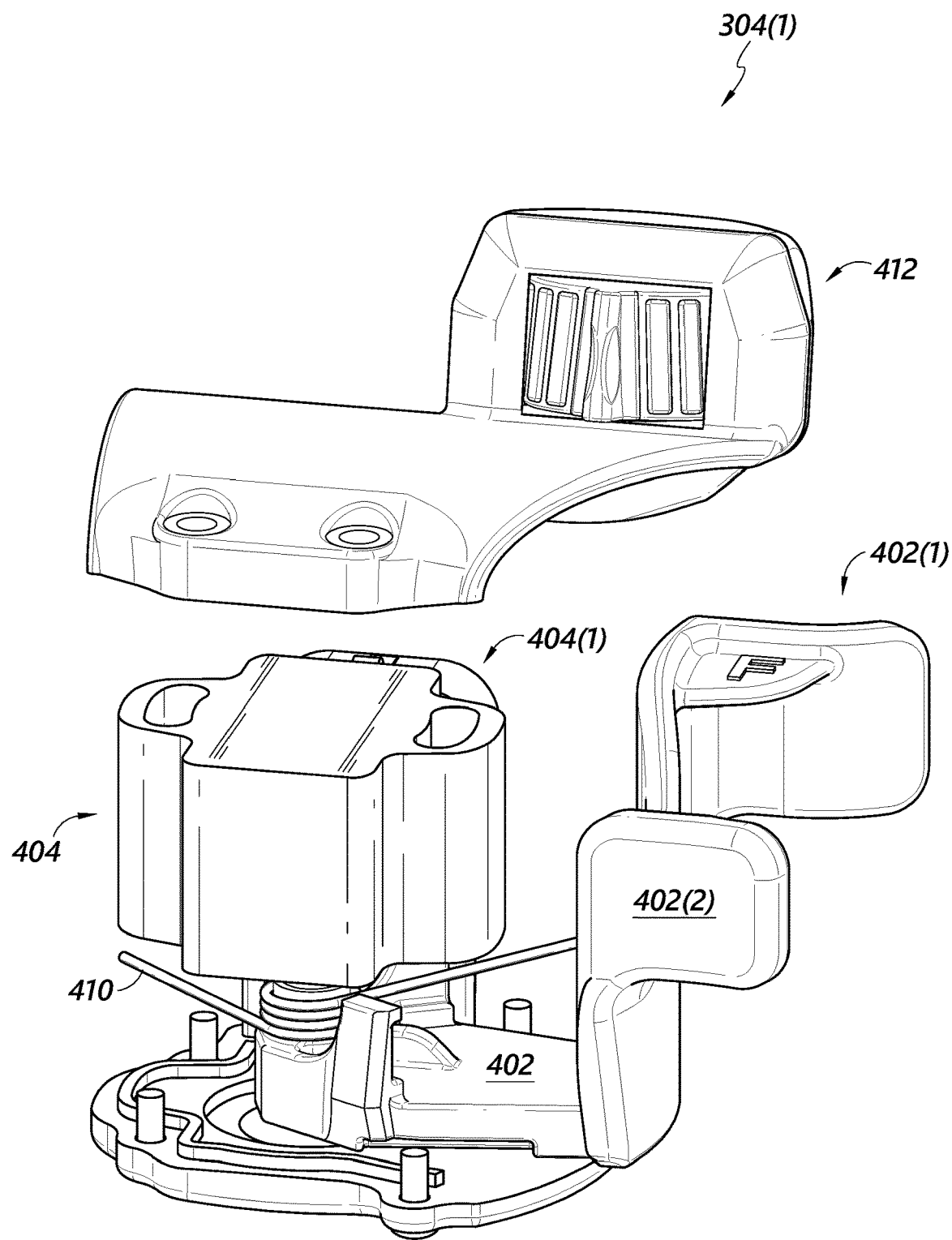
FIG. 4C illustrates a perspective view of the input control assembly of the lawn mower of FIG. 1 with a portion of the housing removed to show a sensor.
Figure 4D:
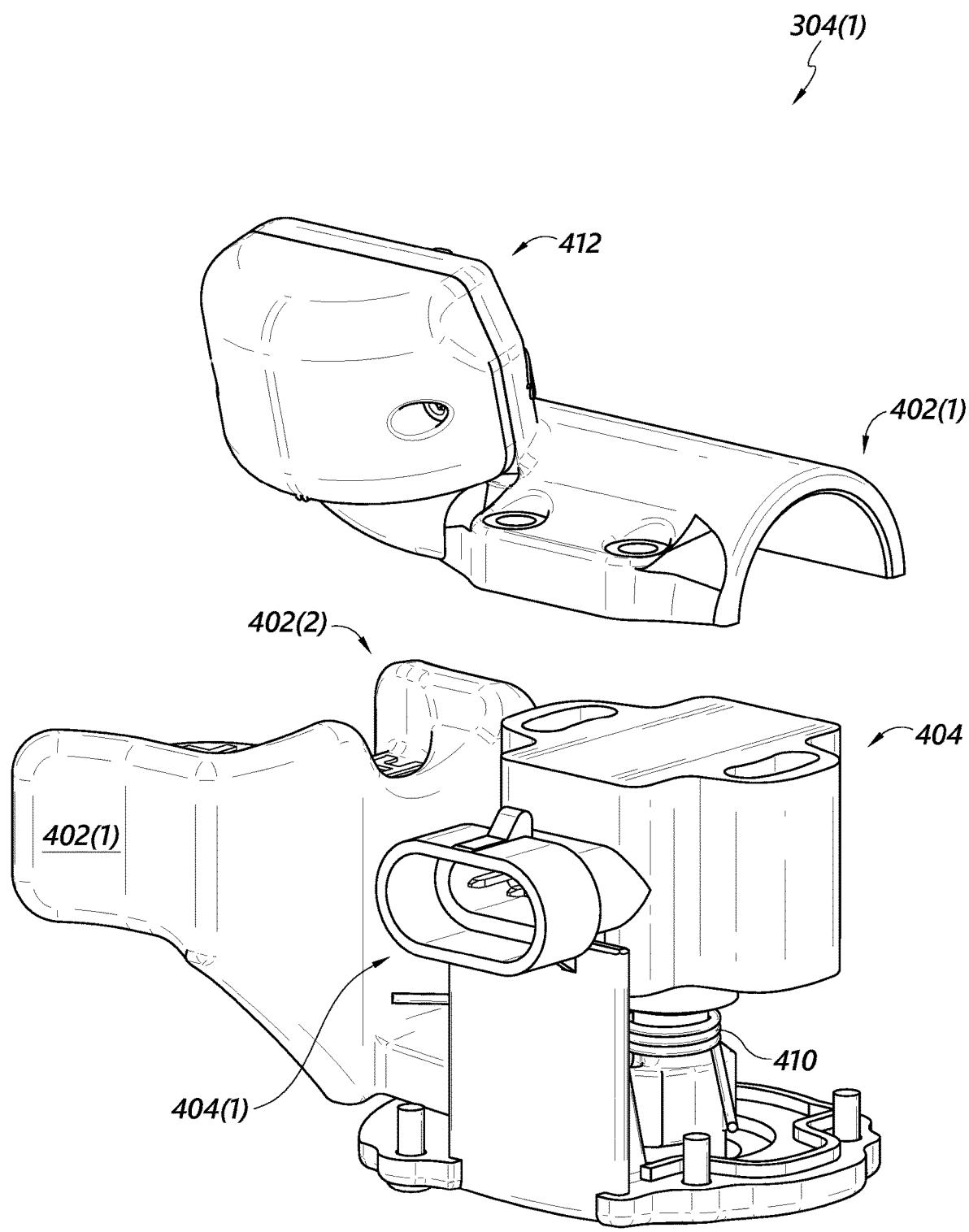
FIG. 4D illustrates another perspective view of the input control assembly of the lawn mower of FIG. 1 with a portion of the housing removed to show a sensor.
Figure 4E:
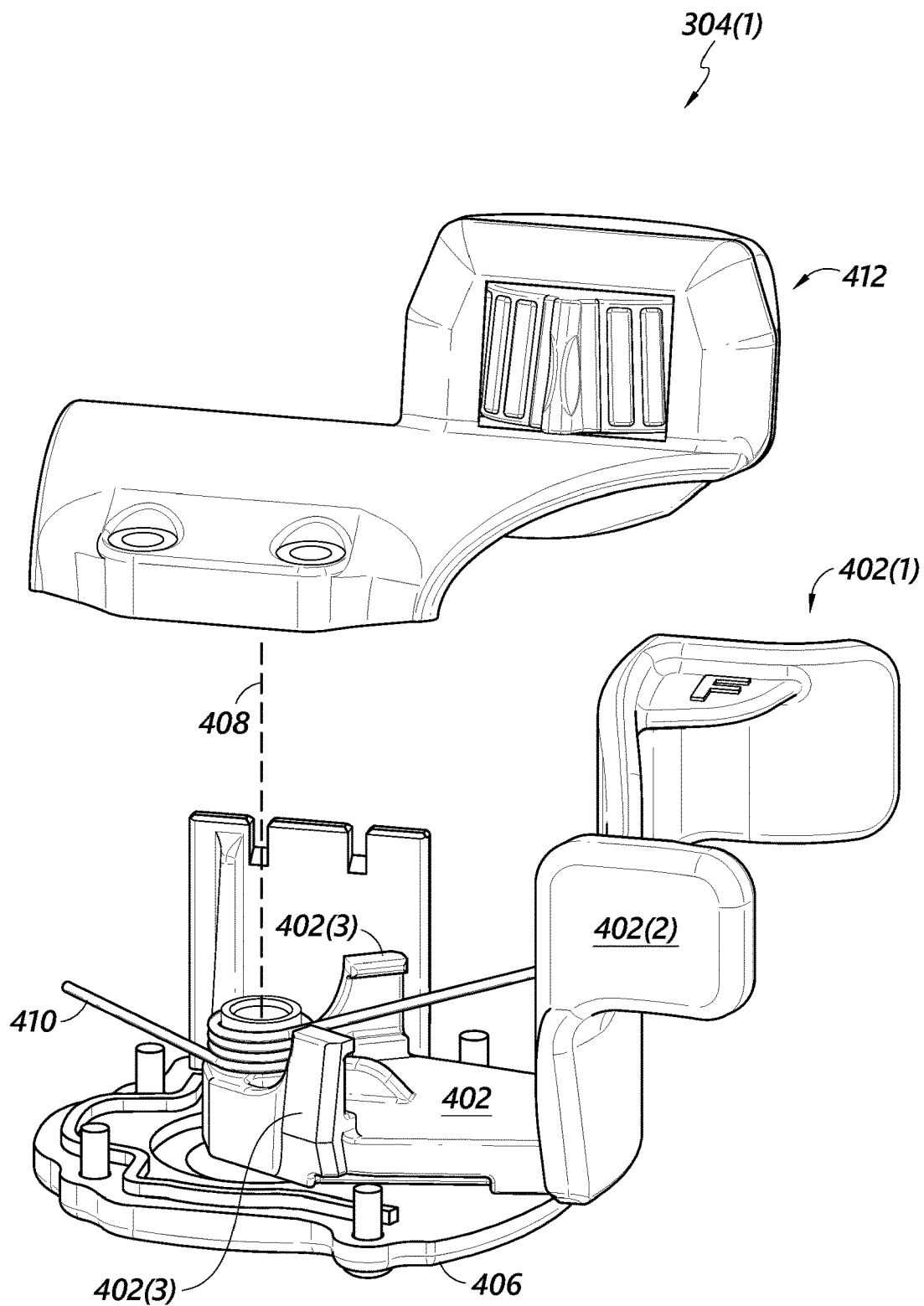
FIG. 4E illustrates a perspective view of the input control assembly of the lawn mower of FIG. 1 with a portion of the housing removed and the sensor removed.
Figure 4F:
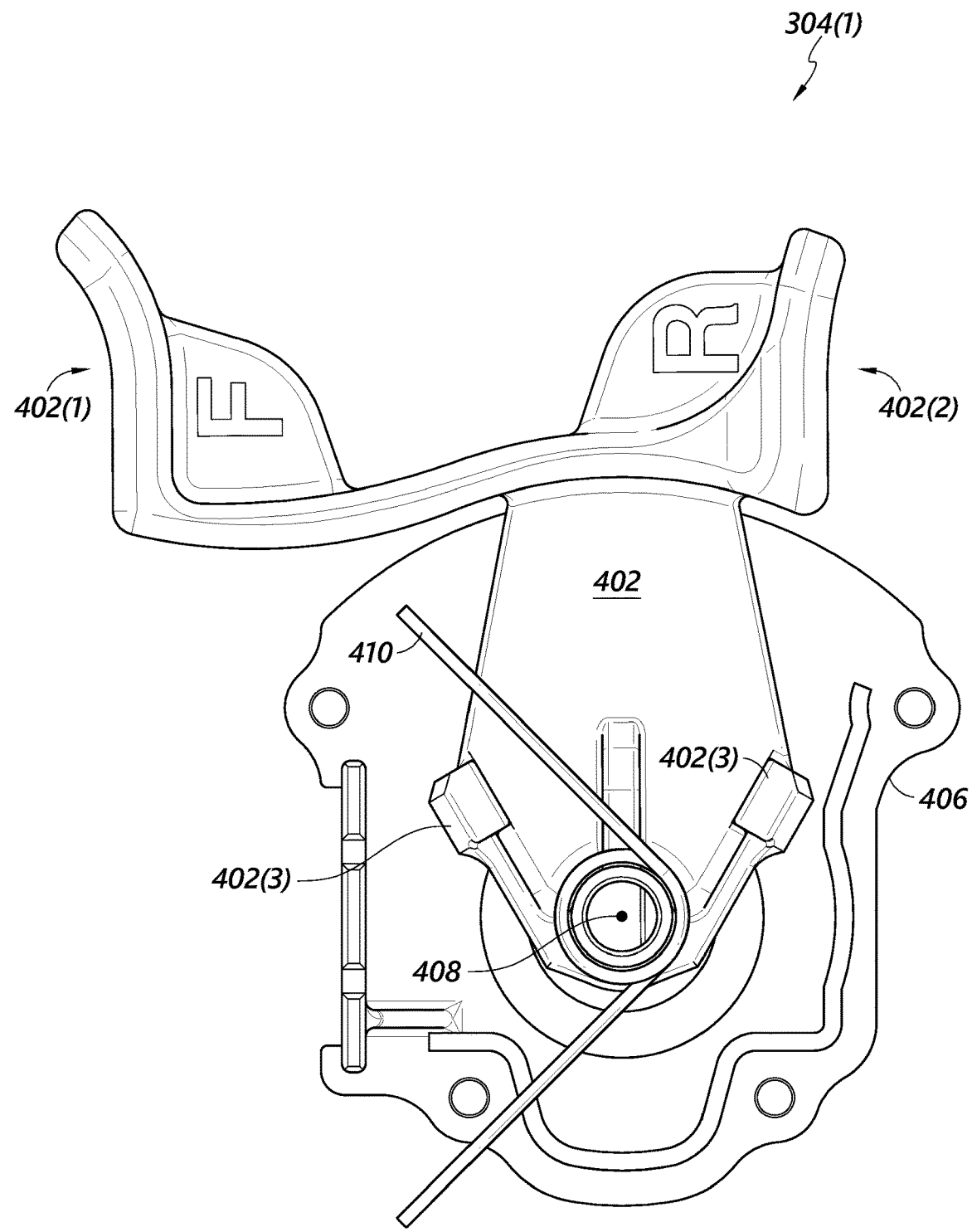
FIG. 4F illustrates a top view of the input control assembly of the lawn mower of FIG. 1 with a portion of the housing removed and the sensor removed.

The input control assembly 304 can include a sensor 404 configured to detect a position of the lever 402. The sensor 404 can be enclosed within a housing 406 of the input control assembly 304. The sensor 404 is illustrated in FIGS. 4C and 4D with a portion of the housing 406 removed. The lever 402 can be configured to rotate around an axis 408, as shown in FIGS. 4E and 4F, wherein the sensor 404 can be configured to detect a rotational position/amount of rotation of the lever 402 around the axis 408 (e.g., a number of degrees of rotation). Although various examples are discussed in the context of the lever 402 rotating around an axis 408, the lever can actuate in other manners, such as in a forward/reverse manner along a rail or other element.

The sensor 404 can generate a signal indicating a position of the lever 402 and/or send the signal to another component of the lawn mower 102, such as via a port/connection 404(1) of the sensor 404. The sensor 404 can generally generate/send an electrical signal in a wireless or wired manner; however, the sensor 404 can be implemented in other manners, such as by using a pull/push cable, pneumatics, hydraulics, etc. In examples, the sensor 404 can include a Hall effect sensor, potentiometer, and/or rotary encoder configured to detect an angle/rotational position and/or electric potential. However, other types of sensors can be implemented.

In some instances, the input control assembly 304 is configured to bias the lever 402 to a particular position, such as a central/default position. For example, the input control assembly 304 can include a biasing element 410 configured to exert a force on the lever 402 to bias the lever 402 to the position shown in FIGS. 4A-4F. To illustrate, as the user actuates the lever 402 away from the central position, the user may experience a feedback force due to the biasing element 410, which can attempt to return the lever 402 to the central position. In some cases, a default/biased position is associated with a particular state of the lawn mower 102, such as an idle/no movement state-zero velocity for a corresponding wheel or the lawn mower 102, a cruise control state-defined cruise control speed for a corresponding wheel or the lawn mower 102, and so on.

FIGS. 4A-4F illustrate an example biasing element 410 implemented as a spring, such as one or more torsion springs or other types of springs. Here, the spring 410 is coupled to the lever 402 around the axis 408. Ends of the spring 410 can be attached to or contact surfaces of the housing 406 to allow the spring 410 to be compressed as the lever 402 is actuated. In some instances, the lever 402/housing 406 includes one or more stoppers/stopper features 402(3) configured to limit the amount of rotation of the lever 402 (e.g., based on the spring 410 contacting the stoppers 402(3)).

Figure 5:
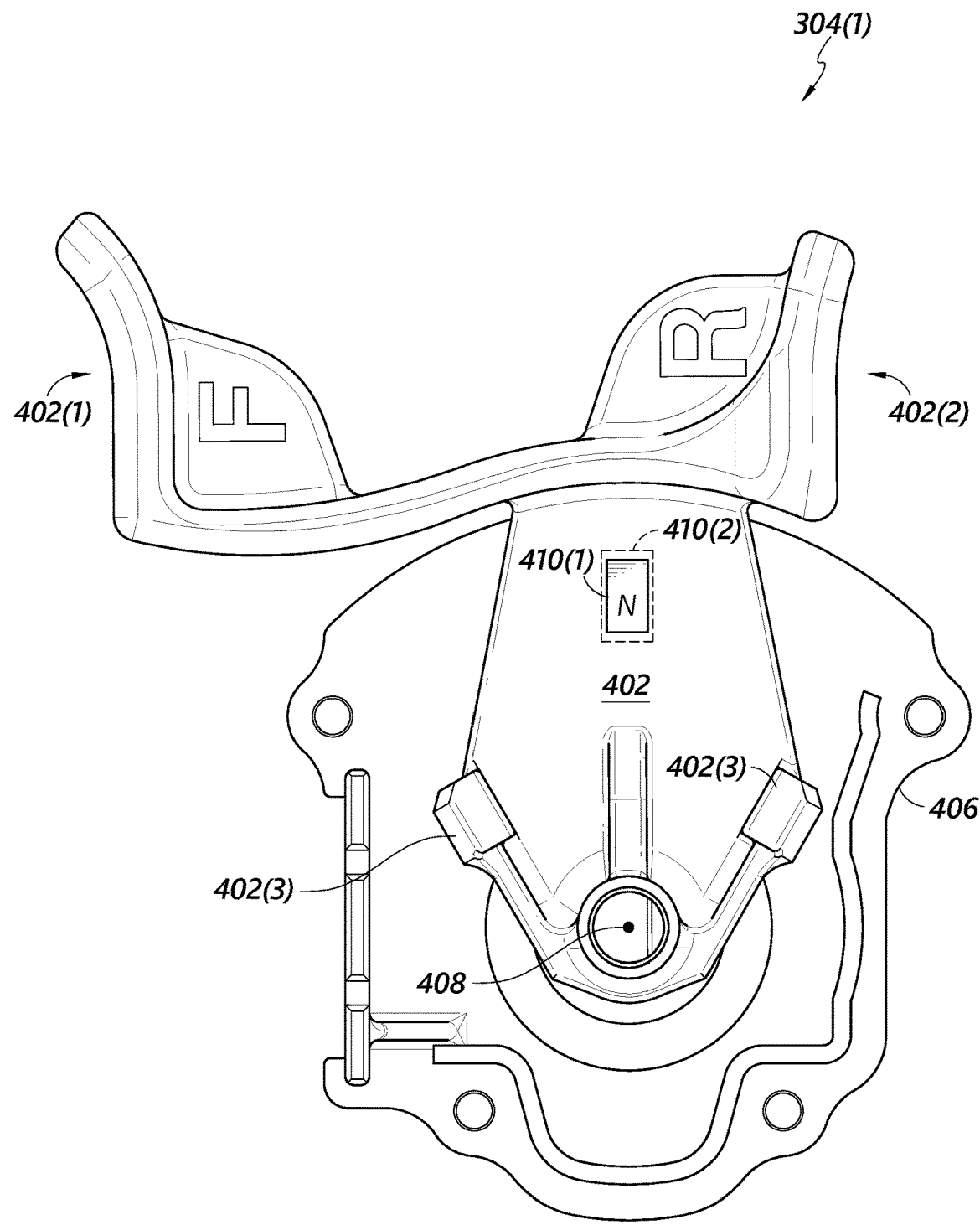
FIG. 5 illustrates a top view of the input control assembly of the lawn mower of FIG. 1 in an example where the biasing feature includes one or more magnets.

Meanwhile, FIG. 5 illustrates an example biasing element 410 implemented as one or more magnets. Here, the magnet 410(1) is disposed on the lever 402 and the magnet 410(2) is disposed on the housing 406. The magnets 410(1) and 410(2) can have opposite polarity such that a user experiences a feedback/attractive force as the lever 402 is moved to a position where the magnets 410(1) and 410(2) are aligned. However, the magnets 410 can be disposed at other locations and/or arranged in other manners within the input control assembly 304 with or without opposite polarity.

Another example magnetic implementation is illustrated below in reference to FIGS. 11A-11C.

In returning to FIGS. 4A-4F, the input control assembly 304 can include a speed selector 412 configured to control a speed/velocity of the lawn mower 102. For example, the speed selector 412 can be manipulated/actuated by a user to set a maximum speed for the lawn mower 102, wherein the lawn mower 102 can be configured to travel at the maximum speed when the lever 402 is fully actuated to a forward or reverse position. To illustrate, in reference to FIG. 4C, the speed selector 412 can be actuated to the right to increase the maximum speed and actuated to the left to decrease the maximum speed. The speed selector 412 can generate and/or send a signal to a component of the lawn mower 102 to set the maximum speed of the lawn mower 102. In some cases, the speed of the lawn mower 102 can be independently controlled from a speed of the blades of the blade assembly 114. As such, a maximum speed of the lawn mower 102 may not affect a maximum speed of the blades.

The speed selector 412 can be ergonomically positioned/designed to enable the user to set the speed in an effective manner, such as with a thumb. For instance, the speed selector 412 can be positioned at the top of the housing 406, at least partly above an opening 414 in the housing 406 that attaches to the handle 302, as shown in FIG. 4A. In examples, a single input control assembly can include a speed selector (which is configured to control a speed of the lawn mower 102). While in other examples, each input control assembly can include a speed selector (which can be used to set a maximum speed of each wheel). Furthermore, the speed selector 412 can be implemented to facilitate other functionality, such as to set other parameters/values for the lawn mower 102. In examples, the speed selector 412 is configurable by a user/system to control a particular component.

Figure 6:
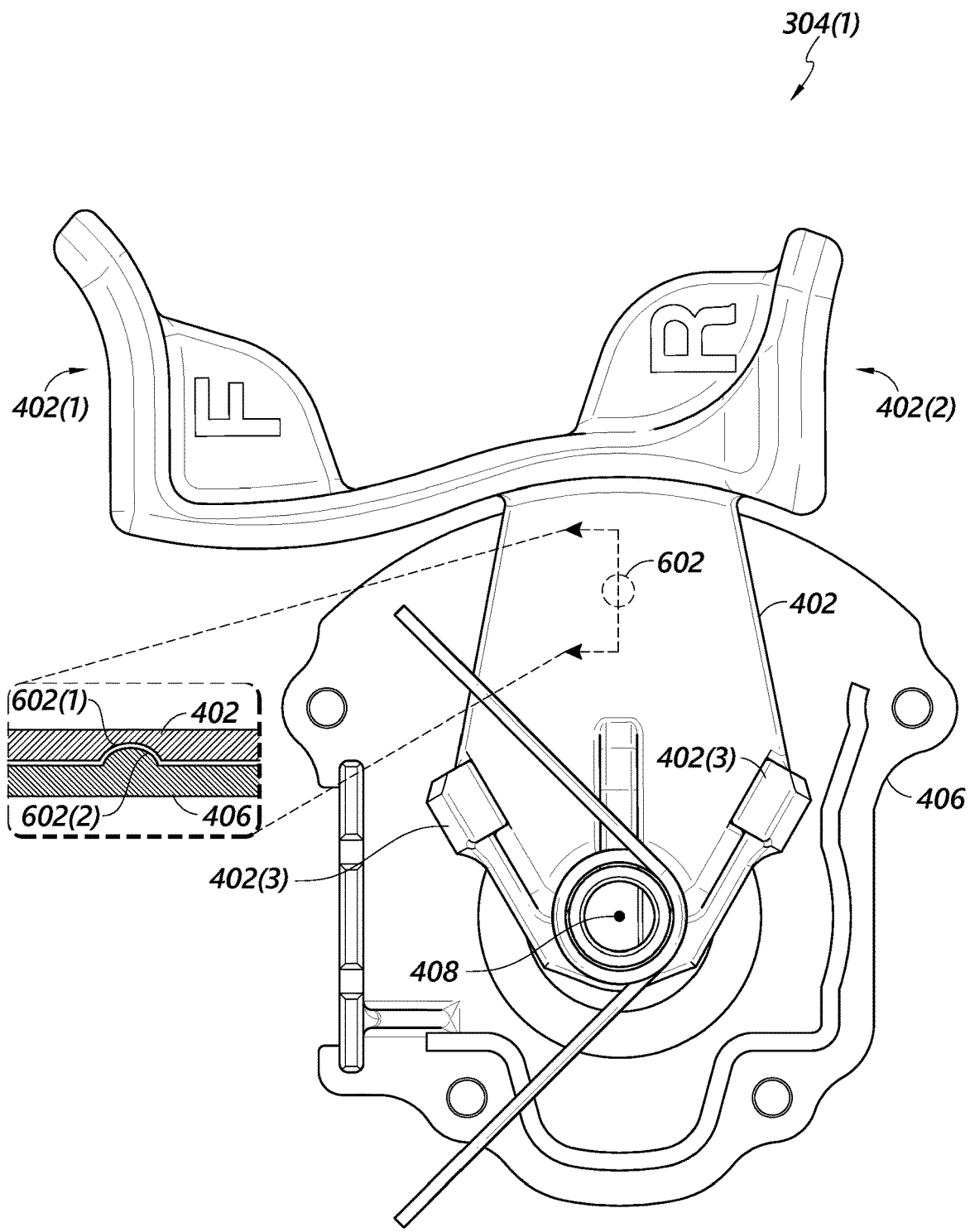
FIG. 6 illustrates a top view of the input control assembly of the lawn mower of FIG. 1 in an example where the input control assembly includes a detent feature.

In some examples, the input control assembly 304 includes a detent feature 602 to indicate that the lever 402 is located at a particular position, as shown in FIG. 6. For instance, the detent 602 can be configured to provide haptic/audible feedback to a user when features 602(1) and 602(2) of the detent 602 engage/mate with each other and/or can be configured to resist movement of the lever 402 from the engagement position. The detent 602 can include a ball, pin, spring, magnet, or other feature on one component (e.g., the lever 402 or housing 406) and/or recess, hole, magnet, or other engagement/mating feature on another component (e.g., the housing 406 or lever 402). In some cases, the detent 602 is disposed in such an orientation to assist the user in identifying a central/neutral position of the lever 602, such as to provide an indication that the user is transitioning between forward and reverse.

In examples, one or more of the components of the input control assembly 304 can be disassembled in a relatively easy fashion to facilitate maintenance of the input control assembly 304. For example, the housing 406 can be opened by loosening one or more fasteners that hold the housing together such that the internal components of the input control assembly 304 can be washed to remove debris, dirt, or other objects.

As noted above, the detent 602 can be implemented as one or more magnets in some cases. In one example, a first magnet is implemented on the housing 406 and a second magnet is implemented on the lever 402, wherein the magnets have opposite polarity to bias the lever 402 to such position, as similarly discussed above in reference to FIG. 5. However, the magnets can have the same polarity in some cases, depending on the design implementation.

Figure 7:
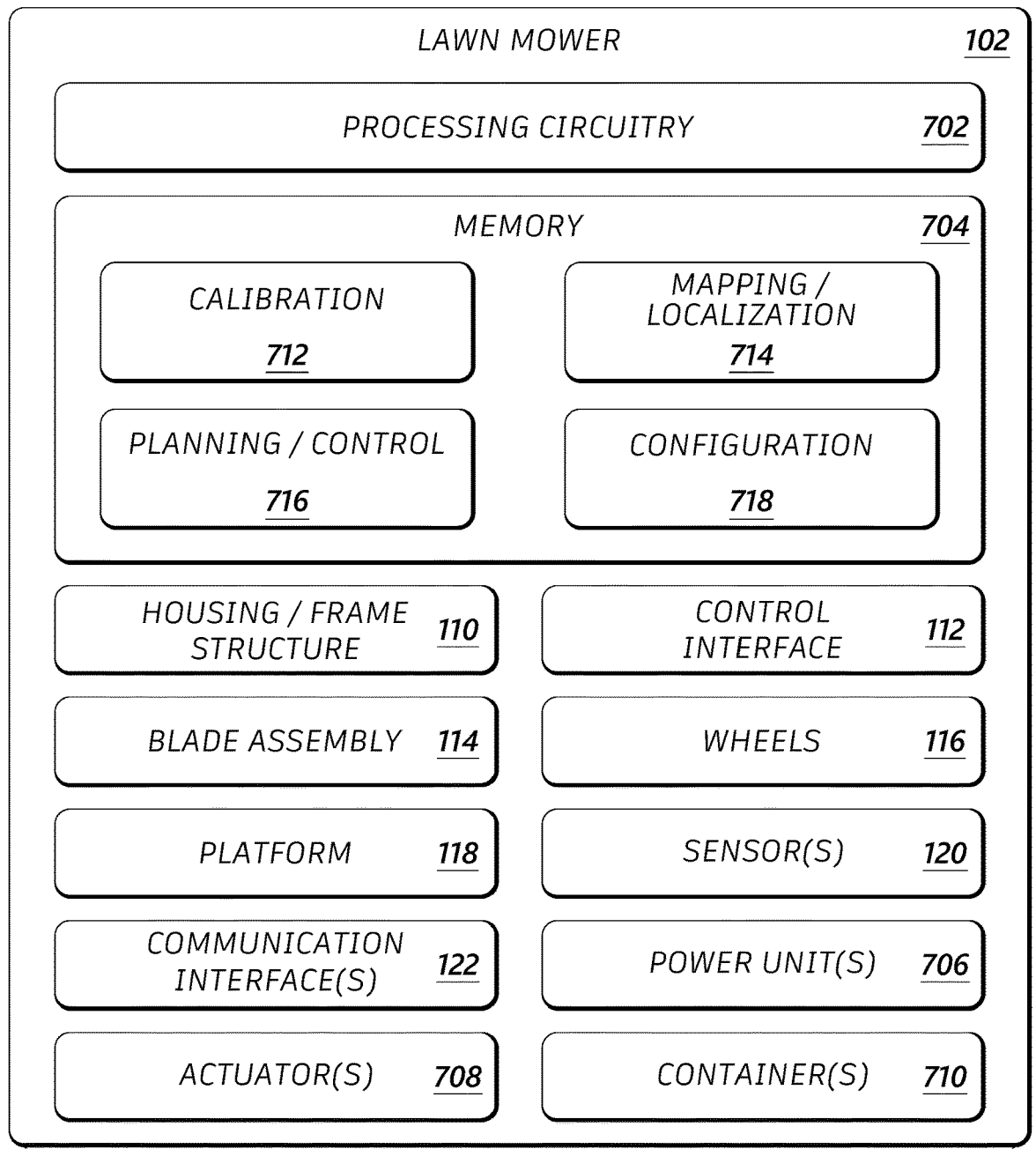
FIG. 7 illustrates additional details of the lawn mower of FIG. 1 that can be implemented in some examples.

FIG. 7 illustrates additional details of the lawn mower 102 that can be implemented in some examples. As shown, the lawn mower 102 can include processing/control circuitry 702, memory 704, the housing/frame structure 110, the control interface 112, the blade assembly 114, the wheels 116, the platform 118, the one or more sensors 120, the one or more communication devices/interfaces 122, one or more power units 706, one or more actuators 708, and/or one or more containers 710. For ease of discussion and illustration, the processing/control circuitry 702 and memory 704 are shown as separate blocks from the other components of the lawn mower 102. However, it should be understood that the processing circuitry 702 and/or memory 704 can be integrated into any of the components of the lawn mower 102 and/or the various components of the lawn mower 102 can include separate instances of the processing circuitry 702 and/or memory 704. For example, the control interface 112 can include its own processing circuitry and/or data storage/memory.

Although the processing circuitry 702 is illustrated as a separate component from the memory 704 and communication interface(s) 122, it should be understood that the memory 704 and/or communication interface(s) 122 can be embodied at least in part in the processing circuitry 702. For instance, the processing circuitry 702 can include various devices (active and/or passive), semiconductor materials and/or areas, layers, regions, and/or portions thereof, conductors, leads, vias, connections, and/or the like, wherein one or more of the memory 704 and the communication interface(s) 122 and/or portion(s) thereof can be formed and/or embodied at least in part in/by such circuitry components/devices.

The processing circuitry 702, memory 704, control interface 112, sensor(s) 120, communication interface(s) 122, power unit(s) 706, and/or actuators 708, and/or other components of the lawn mower 102 can be electrically and/or communicatively coupled using certain connectivity circuitry/devices/features, which can or may not be part of processing circuitry 702. For example, the connectivity feature(s) can include one or more printed circuit boards configured to facilitate mounting and/or interconnectivity of at least some of the various components/circuitry. In some examples, two or more of the components may be electrically and/or communicatively coupled to each other.

The memory 704 may store a calibration component/subsystem 712, mapping/localization component/subsystem 714, planning/control component/subsystem 716, and configuration component/subsystem 718. In examples, one or more of the components 712-718 include executable instructions that, when executed by the processing circuitry 702, cause the processing circuitry 702 to perform various operations discussed herein. For example, one or more of the components 712-718 can include software/firmware. Further, in examples, one or more of the components 712-718 may be implemented as one or more hardware logic components, such as one or more application specific integrated circuits (ASIC), field-programmable gate arrays (FPGAs), program-specific standard products (ASSPs), complex programmable logic devices (CPLDs), and/or the like. For ease of discussion, the components 712-718 are illustrated as separate components. However, it should be understood that one or more of the components 712-718 may be implemented as any number of components to implement the functionality discussed herein (e.g., combined or separated into additional components).

The calibration component 712 may perform calibration of the one or more sensor(s) 120 and/or actuators 708. Calibration may comprise determining one or more sensor intrinsics and/or extrinsics, as well as determining positions of components or subcomponents (e.g., blade height), applied torques relative to currents applied, and the like. Such calibration protocols performed by calibration component 712 may ensure that any one or more components or subcomponents/components of the lawn mower 102 are working properly and/or enable correct calculations to be generated given the lawn mower's 102 current understanding of the relative positions, orientations, and/or parameters of the other components and subcomponents.

The mapping/localization component 714 can receive sensor data from any one or more of the sensor(s) 120, in addition to any one or more outputs from the calibration component 712 to map an area and/or provide a position and/or orientation of the lawn mower 102 relative to the map. In at least one example, sensor data from the one or more sensor(s) 120 can be used to construct (and/or update) a two- and/or three-dimensional map of a scanned area. When updating, preexisting map data may be received from the memory 704 and/or from the computing resource(s) 104. Multiple mapping techniques may be used to construct a two- or three-dimensional map based on the acquired sensor data including, but not limited to SLAM, Kalman filters (Unscented Kalman Filters, Extended Kalman Filters, etc.), occupancy grids, bundle adjustment, sliding window filters, and the like. Such a map can be stored as a signed distance function (SDF), or truncated SDF (TSDF), triangle mesh, mosaics, etc. Use of voxel hashing can improve memory requirements for both storage and raycasting. In at least some examples, sensor data can include radar data indicative of objects/subterranean objects (e.g., pipes, golf balls, rocks, etc.). Such subterranean objects can provide features for use in creating the map. For example, locations of sprinklers, piping, rocks, moisture levels, and the like may be combined (or fused) with other sensor data to both generate the maps and localize against them.

Furthermore, various combinations of sensor data can be used to provide additional insight as derived sensor data. As a non-limiting example, sensor data from wide-angle, dual baseline, image sensors can be used to reconstruct depth of the environment and/or provide additional features for use in generating the map and or localizing the lawn mower 102 against such a map. Any such derived sensor data may be either used for mapping and/or localization, as well as may be associated with the map after it has been generated (e.g., storing the value associated with the portion of the map where the data was collected). Further, in at least some examples, control signals (as may be received and/or generated by the lawn mower 102) can be associated with the map by the mapping/localization component 714. In some examples, satellite-based navigation data (e.g., GNSS data) can be used to inform a Region of Interest (ROI) of satellite imagery to download to, or otherwise augment, a two- or three-dimensional map. Additionally, or alternatively, the lawn mower 102 can download, or otherwise access, weather data as additional sensor data. The weather data can be indicative of, for example, weather conditions for the time of day associated with the other sensor data.

A map can include signed distance functions (SDFs) or truncated signed distance functions TSDFs, mesh representations, UTM grids, mosaics, tiles, etc., including any topological relationship between such sensor data. In some examples, voxel hashing may be used to minimize memory requirements for both map storage and retrieval. Such a map may also be associated with additional sensor data (and/or data derived from the additional sensor data, such as segmentations, classifications, output from machine learning algorithms, etc.). For example, moisture level data, soil density data, vegetative health indicators (e.g., growth, absence of growth, presence of pests, presence of weeds or invasive species, etc.), thermal data, ambient light data, etc. can be associated with one or more locations in a map. Additionally, or alternatively, image sensor data (e.g., color) can be associated with a map as well (e.g., by weighted averaging, or the like), so that a user viewing the map can quickly see a virtual representation of the scanned area, including color.

The planning/control component 716 can determine commands for operating one or more of the actuator(s) 708. In some examples, such component 716 may determine one or more trajectories for the lawn mower 102 to follow (e.g., by determining a series of steering commands, acceleration commands, etc. which cause the lawn mower 102 to follow an intended pattern). Such trajectories may be determined in accordance with waypoints (e.g., GNSS-based waypoints) as can be received from a user via control interface 112 and/or calculated to optimize (e.g., minimize) a length of travel over a defined region of interest (e.g., as may be determined by the computing resource(s) 104). Such calculations can be determined, for example, using Bellman Ford's algorithm, Dijkstra's Algorithm, or otherwise. In some examples in which a control interface (the control interface 112) is coupled to the lawn mower 102, signals received from the control interface 112 can be directly applied to the actuator(s) 708 and/or used to determine resultant control signals to apply to the actuator(s) 708 (e.g., to cause a user to follow a pattern, mow in a straight line, etc.).

In some examples in which the lawn mower 102 is operated manually (e.g., by being pulled, pushed, attached to a mower, controlled via the control interface 112, etc.), the planning/control component 716 can calculate/determine an optimal control pattern for a user to take. As a non-limiting example, such a trajectory can comprise the shortest pattern needed to sweep an area (region) provided and/or otherwise determine control signals for actuation based on input received from a user in order to perform a particular task. In some examples, an optimal control pattern/optimal path and/or an indication of optimal controls can be displayed on the display 310.

In examples, a trajectory and/or control/control signal can be calculated iteratively (and/or periodically), which can provide the lawn mower 102 (and/or associated user(s)) with the most relevant information.

The configuration component 718 can manage configuration data regarding actions/operations performed by the lawn mower 102 for certain signals/input. For example, the configuration data can indicate an action to be performed by the lawn mower 102 in response to a signal from an I/O component, such as a particular component of the input control assembly 304. In examples, the configuration data can be configured/reconfigured by a user (e.g., based on user input). To illustrate, the right-hand input control assembly 304(1) can initially be mapped such that a position of the lever 402 controls a speed of a right drive wheel of the lawn mower 102. Thereafter, the user may choose to operate the lawn mower 102 with a single hand, such as to have a left hand free for other tasks (e.g., use a leaf blower). Here, the user can provide input via the control interface 112 and/or computing resource(s) 104 such that the right-hand input control assembly 304(1) controls a speed of both drive wheels for the lawn mower 102. This can allow the user to operate the lawn mower 102 with one hand. Similarly, the configuration data can specify an action/operation to be performed for input provided via the speed selector 412 and/or any other element/component of the control interface 112.

The one or more power units 706 can be configured to manage and/or provide power for one or more components of the lawn mower 102. In some examples, the one or more power units 706 include one or more batteries, such as a lithium-based battery, a lead-acid battery, an alkaline battery, and/or another type of battery. The one or more power units 706 can comprise one or more devices and/or circuitry configured to provide a source of power and/or provide power management functionality. Further, the power unit(s) 706 can include a capacitor(s), in some cases. Moreover, in some examples the one or more power units 706 include a fuel-based engine, such as an internal combustion engine, and/or a fuel tank to store a fuel source. In some instances, a first set of components are operated from a first power source (e.g., fuel-based engine), while a second set of components are operated from a second power source (e.g., batteries).

The one or more actuators 708 can include one or more motors to provide torque to the one or more wheels 116/114(3), a linear actuator to raise and/or lower the blade assembly 114, a motor to spin a blade for cutting, one or more brakes associated with the one or more wheels 116/114(3), and the like. Such actuators may further comprise, for example, electric and/or mechanical motors, hydraulics, pneumatics, and the like. Upon receiving a signal from one or more the processing circuitry 702 and a component stored in the memory 704, an actuator(s) may actuate in order to effectuate a trajectory (e.g., steering, acceleration, speed, etc.), release a substance (e.g., fertilizer, seed, herbicide, pesticide, insecticide, seed, etc.), raise/lower the blade assembly 114, raise/lower or otherwise adjust the platform 118, and so on. The one or more containers 710 can be configured to hold grass/yard clippings and/or a substance(s) (e.g., fertilizer, seed, herbicide, pesticide, insecticide, seed, etc.), which can be released in an environment using an actuator.

In some examples, the lawn mower 102 can alter user provided input to ensure consistent mowing and/or safe operation of the autonomous lawn mower. As non-limiting examples, control signals can be determined based on user input to cause the lawn mower 102 to move along straight lines, to perform smooth transitions between blade speeds and/or heights, to ensure consistent and uniform turns, to limit proximity to obstacles, to follow/track an object (such as a curb or fence line-either detected in sensor data, determined from map data associated with a map of the area, or the like), to ensure that the lawn mower 102 stays within a predefined boundary, and the like. In at least some examples where a pattern is available to the lawn mower 102 when the control interface 112 is engaged, the lawn mower 102 may ensure that positional deviations from the pattern are minimized (e.g., by limiting a control input proportionally to a Euclidian distance to a nearest point along the pattern), while relaxing any one or more other constraints. To illustrate, a user may be able to control the lawn mower 102 at speeds faster or slower, at blade heights higher or lower, at blade speeds faster or slower, etc., than those associated with the pattern, so long as the lawn mower 102 proceeds along the pattern. In those examples in which an object is tracked or followed, sensor data from the one or more sensors associated with the lawn mower 102 may be used to ensure the lawn mower 102 does not run into the object and/or off the curb, while in the cases of fences and/or curbs, a consistent distance is maintained to the tracked object.

In some examples, the lawn mower 102 can compensate for various conditions, such as environmental conditions and/or conditions of the components of the lawn mower 102. Such compensation can occur when the lawn mower 102 is operating in a manual mode and/or autonomous mode. In one example, the processing circuitry 702 can determine that one or more drive wheels have lost traction on a surface. If one of the drive wheels has lost traction, the processing circuitry 702 can adjust the other drive wheel (e.g., reducing the speed of the other wheel) such that the lawn mower 102 can maintain the appropriate path (without being undesirably pulled to one side). In another example, the processing circuitry 702 can update a speed of a drive wheel when there is a difference between a speed of a first drive wheel and a speed of a second drive wheel and the same torque values are applied to drive the first and second wheels. Here, the difference in speed can be due to the functioning of a component, such as a motor, gearbox, or other actuator/sensor/etc., which may be due to manufacturing tolerances or otherwise. A speed of a wheel can be determined from a sensor at the wheel. To address the difference, the processing circuitry 702 can cause a speed of one of the drive wheels to be increased (e.g., for the slower wheel) and/or a speed of the other drive wheel to be decreased (e.g., for the faster wheel). In yet another example, the processing circuitry 702 can update a speed of a drive wheel when there is a difference in tire pressure between one or more wheels, which can cause the lawn mower 102 to pull to one side. Here, the processing circuitry 702 can receive tire pressure data from one or more wheels, which can include drive wheels and/or non-drive wheels. To address the difference, the processing circuitry 702 can adjust a speed of one or more of the drive wheels.

In a further example of compensating for a condition, the processing circuitry 702 can update a speed of a drive wheel when the lawn mower 102 is traveling on an incline/decline, such as traveling up/down a hill, across a hill, etc. This can allow the lawn mower 102 to maintain the appropriate speed and/or trajectory/path in instances where the lawn mower 102 might otherwise be undesirably pulled down the hill. For instance, if the lawn mower 102 is transitioning from a flat section to a hill, the processing circuitry 702 can determine the appropriate torque adjustment to apply to the drive wheels to maintain the same speed, which can be based on an amount of torque previously applied to climb the hill (when the hill has been traversed previously), map data indicating elevation, motor feedback, forward progression, kinematic and/or dynamic models of the lawn mower 102, and the like. In examples, torque may be applied to one side (or wheel) to compensate for various orientations of the lawn mower 102 while advancing up the hill. Further, any other parameter which controls an aspect of the lawn mower 102 can be adjusted (e.g., blade speed, blade height, etc.) to compensate for various conditions/events.

In some examples, a user can provide one or more preferences to configure one or more parameters for the lawn mower 102. For example, a user can provide input to configure/reconfigure configuration data for an I/O device and/or other components of the lawn mower 102, such as to map a particular component of an input control assembly to a particular action, define the sensitivity of an I/O device (e.g., an amount of speed change that corresponds to an amount of actuation of a lever), define a maximum speed of the lawn mower 102 (without having to interface with the speed selector 114), define a braking rate (e.g., slow or fast), and so on. One or more user preferences can be stored at the lawn mower 102 and/or the computing resource(s) 104. As such, the lawn mower 102 can be personalized for a particular user.

The lawn mower 102 can load one or more user preferences for a user when it is determined that the user is operating the lawn mower 102. For instance, the processing circuitry 702 can determine an identity of a user that is operating the lawn mower 102 based on biometrics (e.g., facial recognition, finger print scanner, etc.), a wireless/wired connection of a user device to the lawn mower 102, etc. In examples, a user device can include the portable device 104(N), a dedicated a Radio-Frequency Identification (RFID) device/tag, or another device storing a user identifier or other information that can be linked to a user. When a user is identified, the processing circuitry 702 can determine/load one or more preferences for the user, which can be stored locally on the lawn mower 102 and/or stored on the computing resource(s) 104.

In some examples, the lawn mower 102 can provide training data to a user to assist the user in operating the lawn mower 102. For example, the display 310 of the control interface 112 can display a video/image/information indicating how to operate the lawn mower 102, such as in a manual mode and/or autonomous mode. In a manual mode, the lawn mower 102 can monitor the input provided by the user and/or one or more parameters regarding operation of the lawn mower 102 to determine how well the user is operating the lawn mower 102 (e.g., following the training data). The lawn mower 102 and/or the computing resource 104 can process such data to determine one or more suggestions for operating the lawn mower 102, such as how the user can better operate one or more input controls to drive the lawn mower 102 in a more effective manner. The lawn mower 102 can output the one or more suggestions to the user, such as via the display 310.

In some examples, the lawn mower 102 can perform one or more emergency operations to address an unsafe/emergency condition. For instance, the processing circuitry 702 can detect, based on sensor data, that the lawn mower 102 would collide with an object or travel off a ledge/cliff if the lawn mower 102 continues on a current path/trajectory. Here, the processing circuitry 702 can cause the lawn mower to brake at a rate that is above a threshold, cause the lawn mower 102 to change a trajectory, cause the blades to stop within a predefined period of time (and/or as quickly as possible), and/or cause the blade assembly 114 to be raised.

Figure 8:
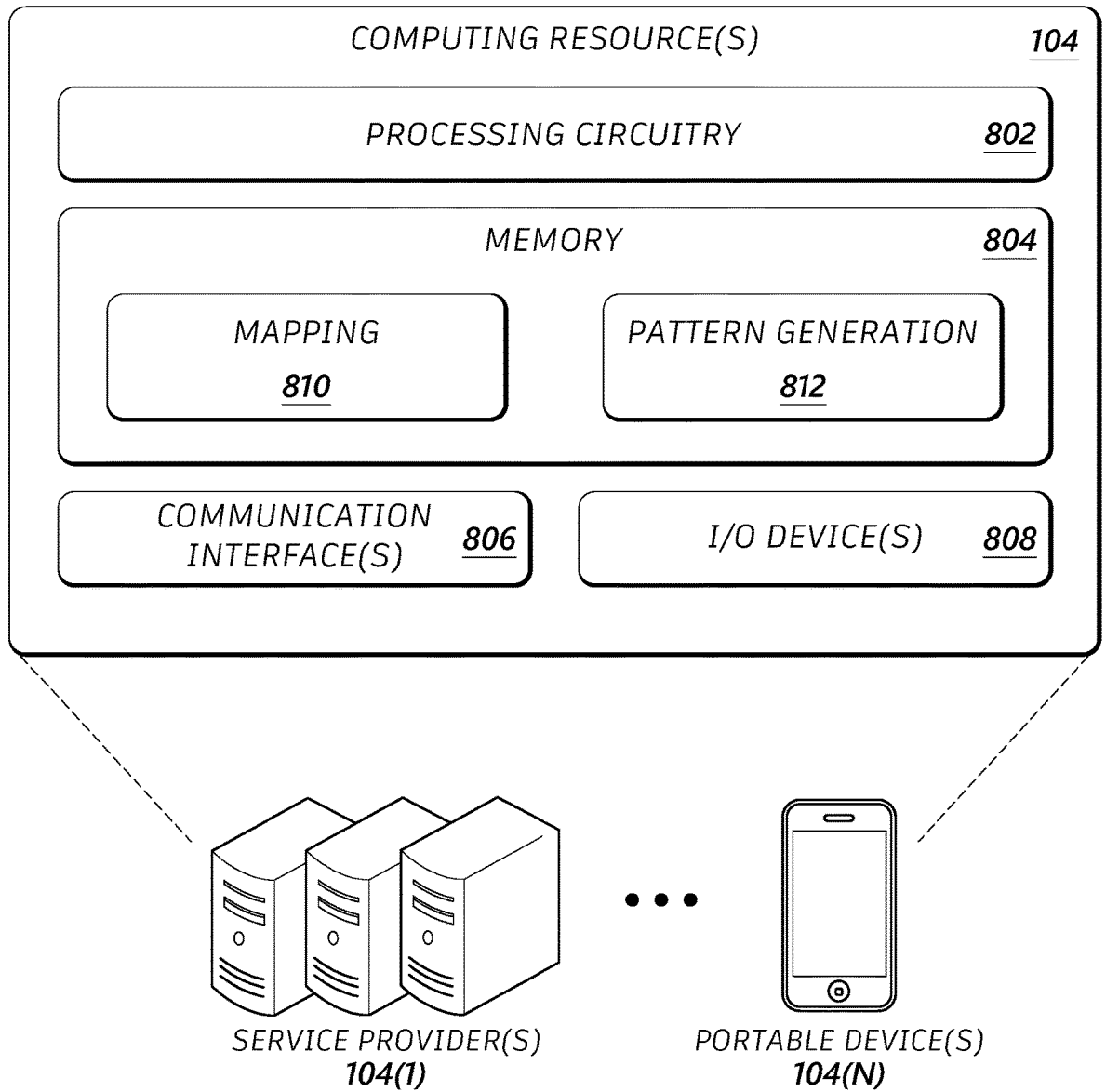
FIG. 8 illustrates details of the computing resource(s) of FIG. 1 that can be implemented in some examples.

FIG. 8 illustrates details of the computing resource(s) 104 that can be implemented in some examples. As shown, the computing resource(s) 104 can include processing/control circuitry 802, memory 804, one or more communication devices/interfaces 806, and/or one or more I/O devices 808. For ease of discussion and illustration, the processing/control circuitry 802 and memory 804 are shown as separate blocks from the other components. However, it should be understood that the processing circuitry 802 and/or memory 804 can be integrated into any of the components of the computing resource(s) 104 and/or the various components of the computing resource(s) 104 can include separate instances of the processing circuitry 802 and/or memory 804.

The processing circuitry 802, memory 804, one or more communication devices/interfaces 806, and/or one or more I/O devices 808 can be electrically and/or communicatively coupled using certain connectivity circuitry/devices/features, which can or may not be part of processing circuitry 802. For example, the connectivity feature(s) can include one or more printed circuit boards configured to facilitate mounting and/or interconnectivity of at least some of the various components/circuitry. In examples, two or more of the components may be electrically and/or communicatively coupled to each other.

The memory 804 can store a mapping component 810 and a pattern generation component 812. In examples, one or more of the components 810-812 include executable instructions that, when executed by the processing circuitry 802, cause the processing circuitry 802 to perform various operations discussed herein. For example, one or more of the components 810-812 can include software/firmware modules. Further, in examples, one or more of the components 810-812 may be implemented as one or more hardware logic components, such as one or more application specific integrated circuits (ASIC), field-programmable gate arrays (FPGAs), program-specific standard products (ASSPs), complex programmable logic devices (CPLDs), and/or the like. For ease of discussion, the components 810-812 are illustrated as separate components. However, it should be understood that one or more of the components 810-812 may be implemented as any number of components to implement the functionality discussed herein (e.g., combined or separated into additional components).

The mapping component 810 can receive sensor data (and/or data derived therefrom) from the one or more sensor(s) 120 and/or other components of the lawn mower 102 (e.g., via communication interface(s) 806) and use such data to generate a map of an area. The mapping component 810 can perform functionality similar to, or the same as, that described above in reference to the mapping/localization component 714. For example, such processing can be performed remotely by the mapping component 810, instead of being performed locally by the lawn mower 102. Further, in examples, one or more of such processing can be distributed amongst the mapping/localization component 714 and the mapping component 810.

The pattern generation component 812 can determine an optimal path and/or waypoints for the lawn mower 102 to follow to perform a given task such as, but not limited to, a path to follow when mowing an indicated area.

In examples, the computing resource(s) 104 can receive any other form of data (e.g., user authentication, obstacle detections, and the like) and process the data and make it available to any other user. As several non-limiting examples, the computing resource(s) 104 can compute statistics about a user operating the lawn mower 102 (such as amount of time mowed, an area mowed, and the like) and make that available to an end user (e.g., via a web interface). Similarly, additional data about obstacles received from the lawn mower 102 may be sent to an additional user to ensure that the obstacle is cleared for later autonomous mowing by the lawn mower 102.

In examples, the computing resource(s) 104 can be configured to perform any one or more of the functions discussed above in reference to components 712-718, wherein the computing resource(s) 104 can be configured to communicate with the lawn mower 102 regarding such functions/processing.

The one or more I/O devices 808 can include one or more displays, buttons, microphones, speakers, microphones, keyboards, joysticks, mice, touch pads, wearable devices (e.g., optical head-mounted display), and so on. The one or more I/O devices 808 can be configured to receive touch, speech, gesture, or any other type of input. The one or more displays can include a liquid-crystal display (LCD), a light-emitting diode (LED) display, an organic LED display, a plasma display, an electronic paper display, or any other type of technology. In some examples, the one or more displays include one or more touchscreens.

The processing circuitry 702/802 may include one or more processors, processing circuitry, processing modules/units, chips, dies (e.g., semiconductor dies including come or more active and/or passive devices and/or connectivity circuitry), microprocessors, micro-controllers, digital signal processors (DSPs), microcomputers, central processing units (CPUs), graphics processing units (GPUs), field programmable gate arrays (FPGAs), programmable logic devices, state machines (e.g., hardware state machines), logic circuitry, analog circuitry, digital circuitry, application specific integrated circuits (ASICs), field-programmable gate arrays (FPGAs), program-specific standard products (ASSPs), complex programmable logic devices (CPLDs), and/or any device that manipulates signals (analog and/or digital) based on hard coding of the circuitry and/or operational instructions. Processing circuitry can further comprise one or more, storage devices, which can be embodied in a single memory device, a plurality of memory devices, and/or embedded circuitry of a device. Such data storage can comprise read-only memory, random access memory, volatile memory, non-volatile memory, static memory, dynamic memory, flash memory, cache memory, data storage registers, and/or any device that stores digital information. It should be noted that in examples in which processing circuitry comprises a hardware state machine (and/or implements a software state machine), analog circuitry, digital circuitry, and/or logic circuitry, data storage device(s)/register(s) storing any associated operational instructions can be embedded within, or external to, the circuitry comprising the state machine, analog circuitry, digital circuitry, and/or logic circuitry.

The memory 704/804 (as well as any other memory discussed herein) may include any type of computer-readable media. For example, one or more computer-readable media may include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other data types. One or more computer-readable media that may include, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that may be used to store information for access by a computing device. As used in certain contexts herein, computer-readable media may not generally refer to communication media, such as modulated data signals and carrier waves. As such, computer-readable media should generally be understood to refer to non-transitory media.

Figure 9:
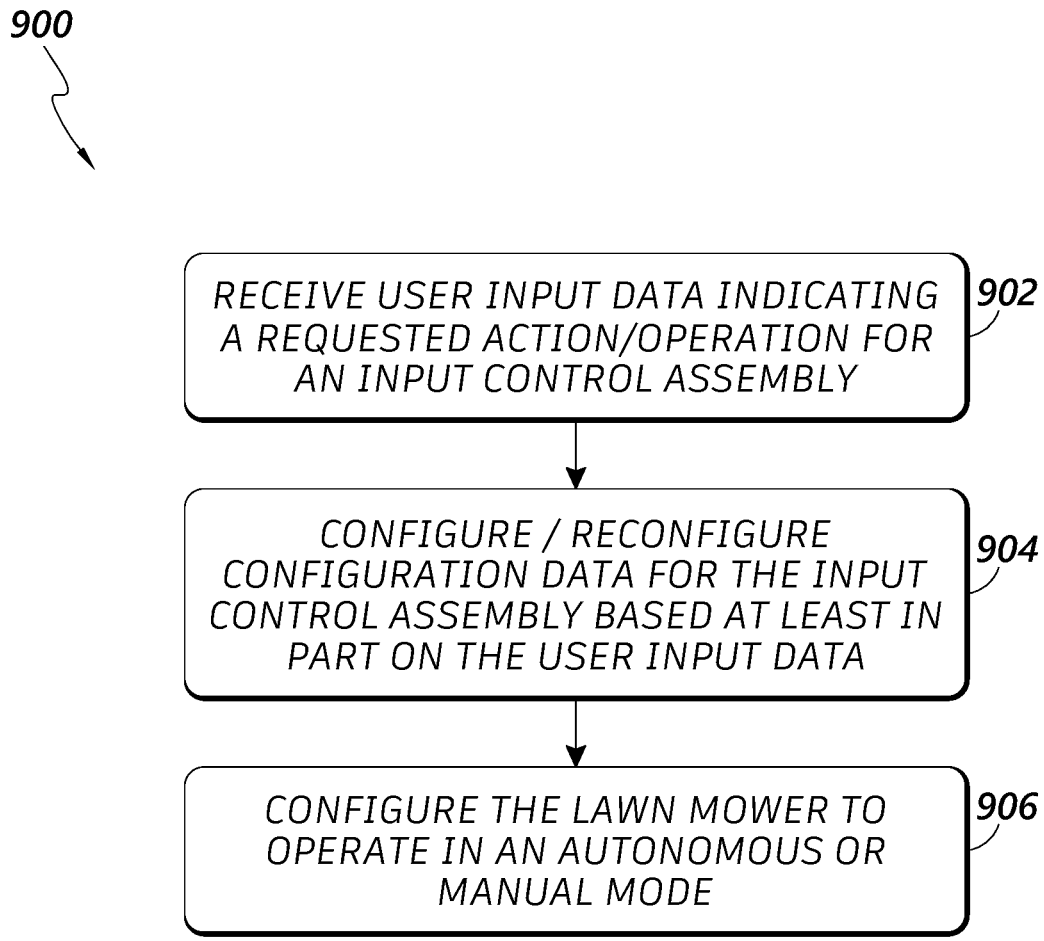
FIG. 9 illustrates an example flow diagram of a process for configuring configuration data indicating a mapping of actions to I/O components of a lawn mower.
Figure 10:
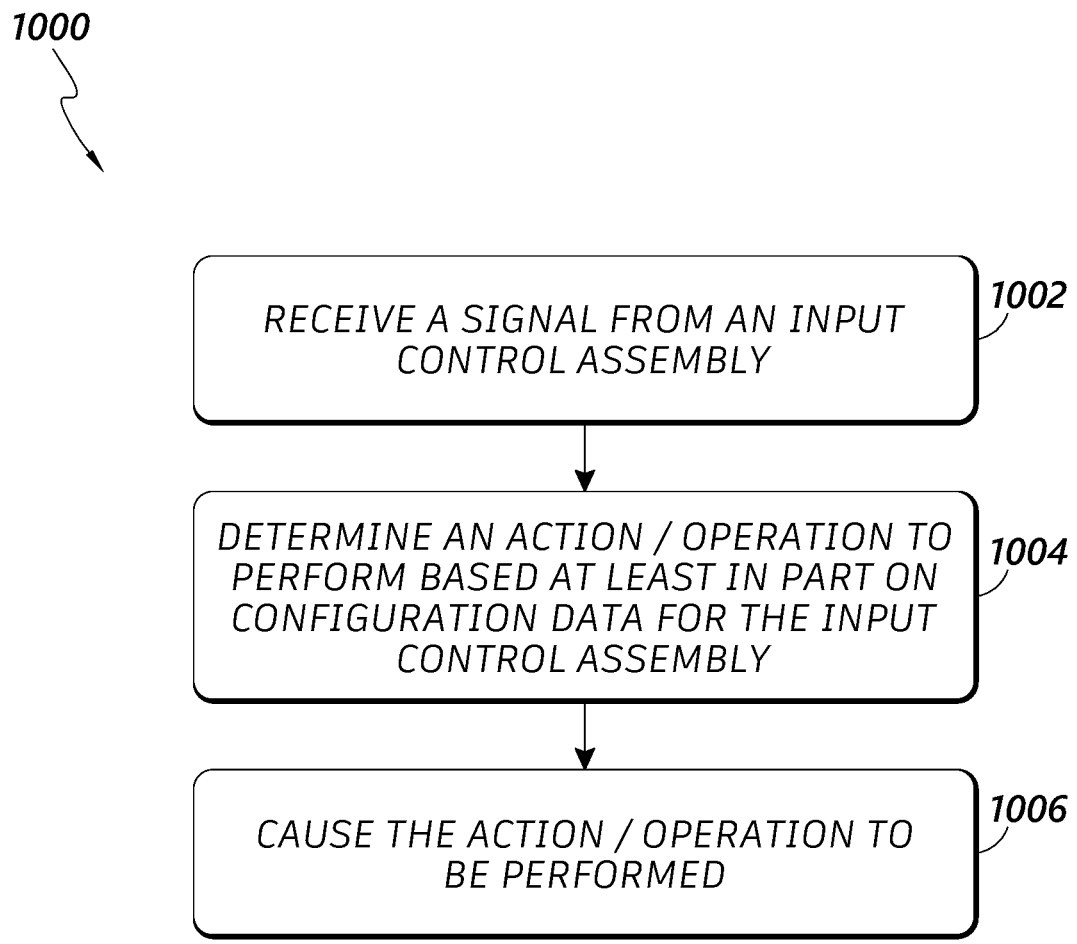
FIG. 10 illustrates an example flow diagram of a process for performing an action based on input received via an input control assembly of a lawn mower.

FIGS. 9 and 10 illustrate example processes 900 and 1000 for perform various operations discussed herein. In examples, the processes 900/1000 may be performed by one or more of the devices/components discussed herein, such as by the lawn mower 102, the computing resource(s) 104, and/or another device/component. In some cases, the process 900/1000 can be performed by the processing circuitry 702/802. However, the process 900/1000 can be performed in other architectures.

The process 900/1000 (as well as each process described herein) is illustrated as a logical flow graph, each graph of which represents a sequence of operations that can be implemented in hardware, software, or a combination thereof. In the context of software, the operations represent executable instructions stored on one or more computer-readable media that, when executed by processing circuitry, perform the recited operations. Generally, executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement a process. Further, any number of the described operations may be omitted.

FIG. 9 illustrates the example process 900 for configuring configuration data indicating a mapping of actions to I/O components of a lawn mower, such as one or more elements of an input control assembly.

At 902, the process 900 includes receiving user input data indicating an action for an input control assembly. For example, a user can provide user input via the control interface 112 and/or the computing resource(s) 104 indicating an action that the user would like to be associated with operation of a particular component of the input control assembly 304.

At 904, the process 900 includes configuring/reconfiguring configuration data for the input control assembly based at least in part on the user input data. The configuration data can map an action(s)/operation(s) to an input control. In one illustration, a user can provide input to configure the lever 402 of the right-hand input control assembly 304(1) to control a speed of a right-drive wheel for the lawn mower 102. In another illustration, a user can provide input to configure the lever 402 of the right-hand input control assembly 304(1) to control a speed of both drive wheels for the lawn mower 102. In yet another illustration, a user can provide input to reconfigure the speed selector 412 such that the lawn mower 102 sets a cruise control speed to a current speed whenever the user provides input via the speed selector 412. In further examples, a user can provide input to configure the lever 402/speed selector 412 and/or another component of the input control assembly 304 to control a speed of a blade(s) of the blade assembly 114 and/or a height of the blade assembly 114. As such, one or more components of the input control assembly 304 can be configurable by a user/system.

At 906, the process 900 includes configuring the lawn mower to operate in an autonomous mode or a manual mode. For example, a user can provide input to implement a manual control mode in which the input control assembly 304 is enabled to control the lawn mower 102, such as based on the configuration data. Alternatively, a user can provide input to implement an autonomous mode in which the input control assembly 304 is disabled from controlling the lawn mower 102 and the lawn mower 102 moves in an autonomous manner.

FIG. 10 illustrates the example process 1000 for performing an action based on input received via an input control assembly of a lawn mower. In examples, the process 1000 can be performed while the lawn mower is operating in a manual mode.

At 1002, the process 1000 includes receiving a signal from an input control assembly. For example, the processing circuitry 702/802 and/or another component can receive a signal from the input control assembly 304(1), wherein the signal can indicate that a component of the input control assembly 304(1) has been actuated. In one illustration, a user can actuate the lever 402 of the input control assembly 304(1) to a position. The sensor 404 can detect the position of the lever 402 and generate a signal indicating the position of the lever 402, which can be sent to the processing circuitry 702 and/or another component of the lawn mower 102. In another illustration, a user can actuate the speed selector 412 to set a maximum speed for the lawn mower 102. The speed selector 412 can generate a signal indicating the amount of actuation and send the signal to the processing circuitry 702 and/or another component of the lawn mower 102.

At 1004, the process 1000 includes determining an action/operation to perform based at least in part on configuration data for the input control assembly. For example, the processing circuitry 702/802 can reference configuration data for the input control assembly 304(1) and determine an action/operation that is mapped to a component of the input control assembly 304(1) for which the processing circuitry 702/802 received a signal at block 1002.

At 1006, the process 1000 includes causing the action/operation to be performed. In one illustration, assume that a signal is received at block 1002 indicating that the lever 402 of the right-hand input control assembly 304(1) is actuated, and that it is determined at block 1004 that the lever 402 is mapped in configuration data to a speed of a right drive wheel of the lawn mower 102. Here, the processing circuitry 702 can generate/send the appropriate control signal to cause the speed of the right drive wheel of the lawn mower 102 to be adjusted, such as by sending the control signal to a motor/actuator for the right drive wheel. In another illustration, if a signal is received indicating that the lever 402 of the right-hand input control assembly 304(1) is actuated, and the lever 402 is mapped in configuration data to control a speed of both drive wheels of the lawn mower 102, the processing circuitry 702 can generate/send the appropriate control signal to cause the speed of both drive wheels of the lawn mower 102 to be adjusted. In yet another illustration, assume that a signal is received at block 1002 indicating that the speed selector 412 is actuated, and that it is determined at block 1004 that the speed selector 412 is mapped in configuration data to a maximum speed of the lawn mower 102, the processing circuitry 702 can generate/send the appropriate control signal to adjust the maximum speed of the lawn mower 102 (e.g., the maximum speed of the lawn mower 102 when the lever 402 is fully actuated to a stopped position in a clockwise/counterclockwise manner). As such, the process 1000 can control a lawn mower based on configuration data for an input control.

In some examples, a smoothing algorithm/technique can be applied/implemented to smooth motion of a lawn mower. For example, the processing circuitry 702 can implement a low pass filter, a moving average (including a weighting moving average), Kalman filter, etc. over various signals received from the input control assembly 304 to cause the lawn mower 102 to move in a relatively smooth manner (e.g., avoid abrupt movement, even in instances where the user may quickly provide input). In some instances, the processing circuitry 702 can determine an environment in which the lawn mower 102 is traveling (e.g., determining a type of surface/terrain on which the lawn mower 102 is traveling), an acceleration of the lawn mower 102 (e.g., use accelerometer data indicating an amount of abrupt motion), etc. to smooth motion of the lawn mower 102.

Although various operations of the process 900/1000 (and other operations) are discussed in the context of the right-hand input control assembly 304(1), the same process can be performed for the left-hand input control assembly 304(2) and/or another input control assembly.

Figure 11A:
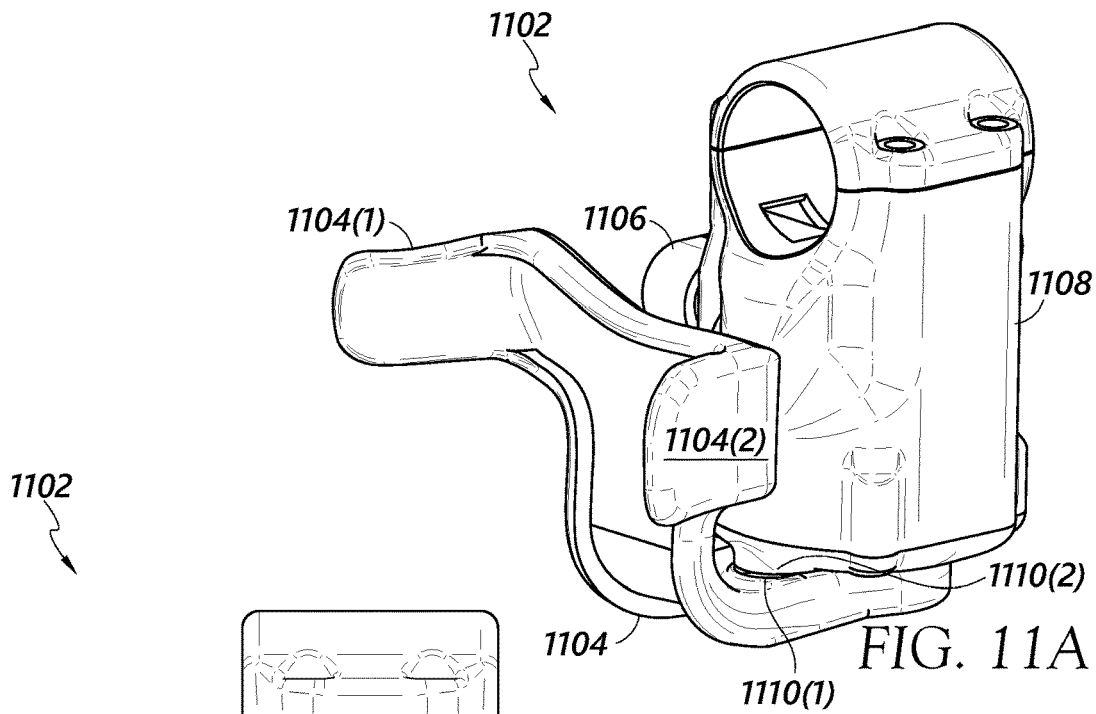
FIG. 11A illustrates a perspective view of an input control assembly that can be implemented for any of the lawn mowers discussed herein.
Figure 11B:
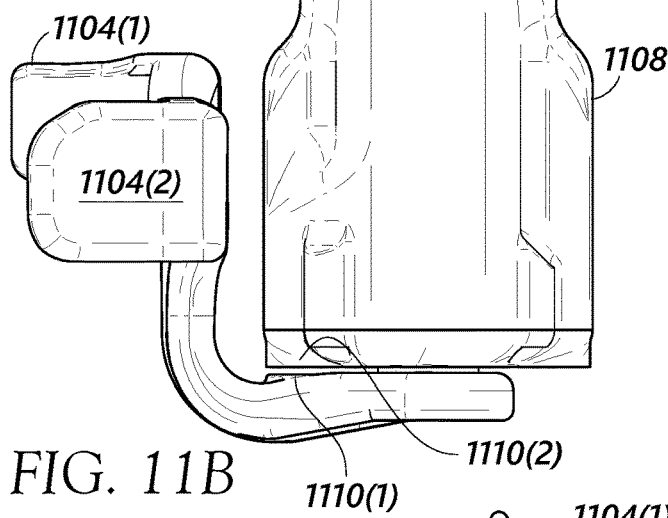
FIG. 11B illustrates a side view of the input control assembly of FIG. 11A.
Figure 11C:
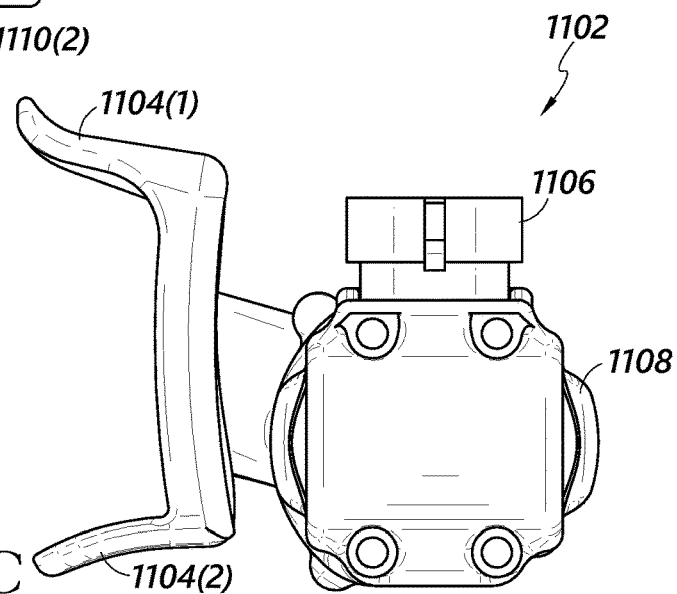
FIG. 11C illustrates a top view of the input control assembly of FIG. 11A.
Figure 12A:
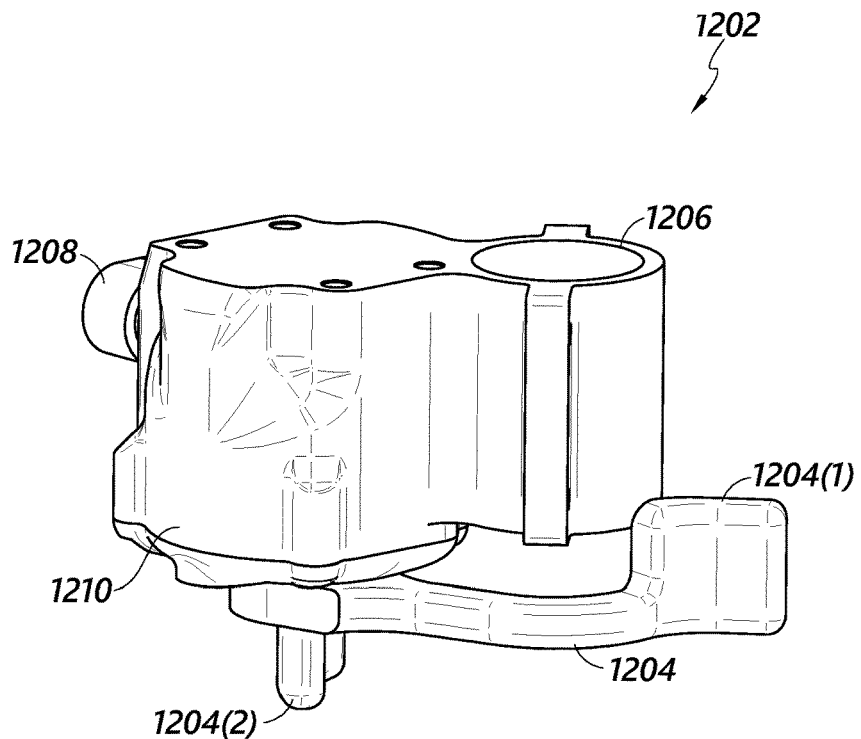
FIG. 12A illustrates a perspective view of an input control assembly that includes a lever that can be configured to rotate with respect to a horizontal axis.
Figure 12B:
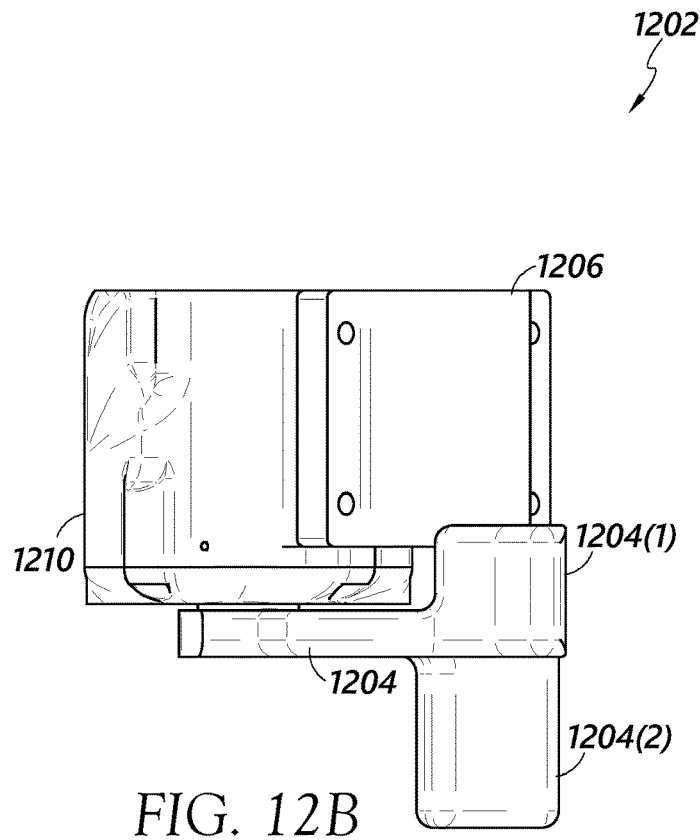
FIG. 12B illustrates a side view of the input control assembly of FIG. 12A.
Figure 12C:
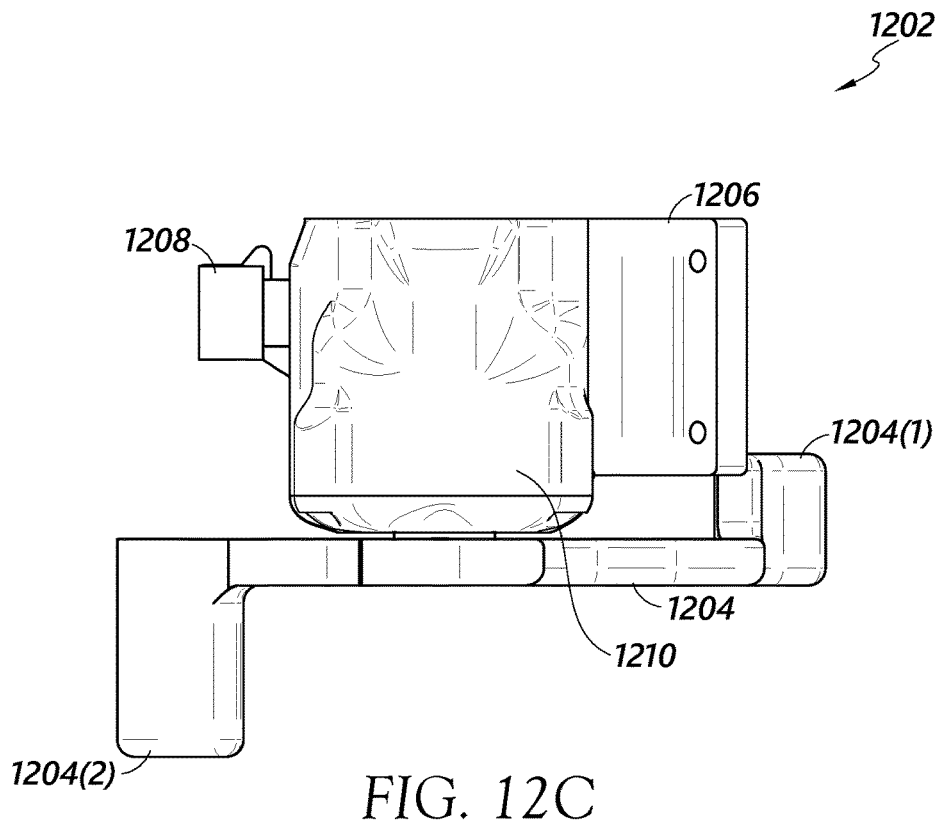
FIG. 12C illustrates another side view of the input control assembly of FIG. 12A.
Figure 12D:
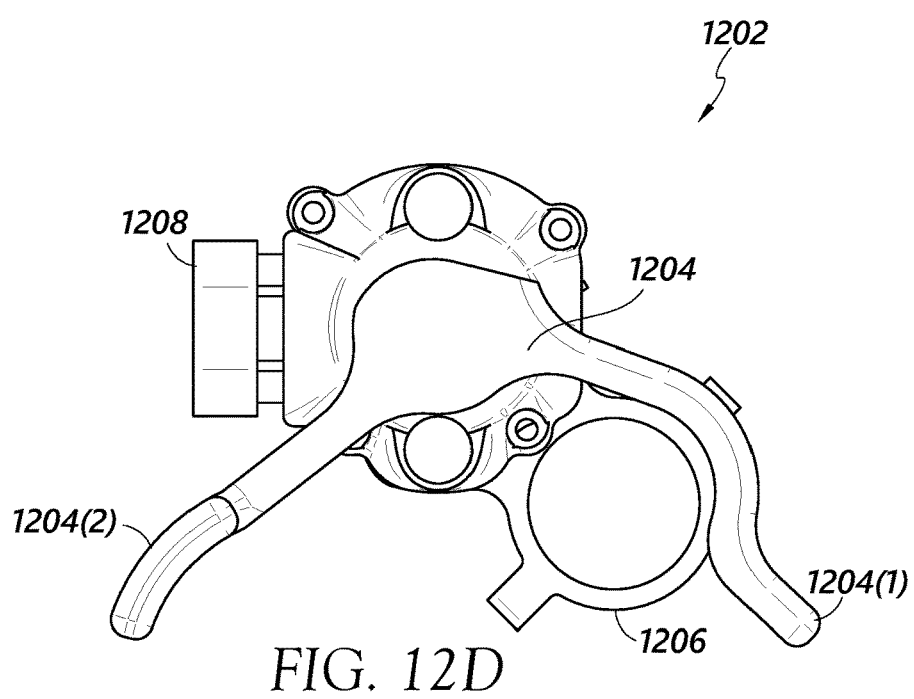
FIG. 12D illustrates a bottom view of the input control assembly of FIG. 12A.
Figure 12E:
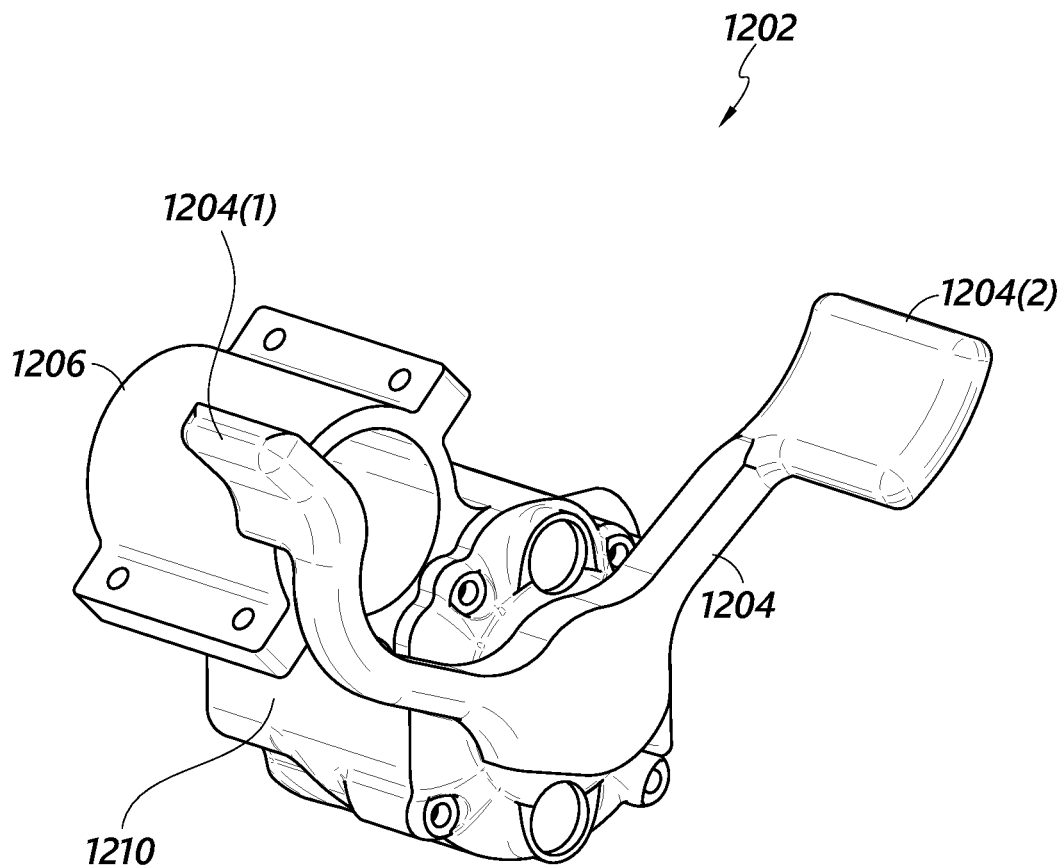
FIG. 12E illustrates another perspective view of the input control assembly of FIG. 12A.

FIGS. 11A-11C illustrate another example input control assembly 1102 including a lever 402 that extends out a bottom portion of the input control assembly 1102. FIG. 11A illustrates a perspective view of the input control assembly 1102, FIG. 11B illustrates a side view of the input control assembly 1102, and FIG. 11C illustrates a top view of the input control assembly. In this example, the input control assembly 1102 is generally operated by a left hand of a user.

The input control assembly 1102 can includes similar features as any of the other input control assemblies discussed herein. For example, the input control assembly 1102 can include a lever 1104 configured to interface/engage with one or more fingers of a user to receive input. The lever 1104 can include a first tab/control 1104(1) configured to be manipulated by a first finger of a user (e.g., an index finger) to cause the lever 1104 to move in a first direction. Further, the lever 1104 can also include a second tab/control 1104(2) configured to be manipulated by a second finger of the user (e.g., thumb) to cause the lever 1104 to move in a second direction. The input control assembly 1102 can include a sensor 1106 configured to detect a position of the lever 1104. The sensor 1106 can be at least partially enclosed within a housing 1108 of the input control assembly 1102. The sensor 1106 can generate a signal indicating a position of the lever 1104 and/or send the signal to another component of a lawn mower.

In some examples, the input control assembly 1102 includes magnets 1110 to provide feedback to a user using the input control assembly 1102. For instances, the magnet 1110(1) can disposed on the lever 1104 and the magnet 1110(2) can disposed in the housing 1108. The magnets 1110 can have opposite polarity such that a user experiences a feedback/attractive force as the lever 1102 is moved to a position where the magnets 1110 are aligned (e.g., the position shown in FIGS. 11A-11C). However, the magnets 1110 can be disposed at other locations and/or arranged in other manners.

FIGS. 12A-12E illustrate an example input control assembly 1202 that includes a lever 1204 generally configured to rotate with respect to a horizontal axis. For example, when the input control assembly 1202 is attached to (via a coupling component/feature 1206) a handle that is positioned horizontal, the lever 1204 can rotate with respect to an axis that is generally parallel to a longitudinal axis of handle. The lever 1204 can include a tab 1204(1) that can be manipulated by a first finger (e.g., a thumb/index finger) and a tab 1204(2) that can be manipulated by a second finger (e.g., an index finger/thumb) in an over handle or below handle manner (e.g., with the fingers slightly above or below the handle). In examples, the input control assembly 1202 can be implemented as a right-hand control; however, the input control assembly 1202 can be implemented as a left-hand control.

The input control assembly 1202 can include similar features as any of the other input control assemblies discussed herein. For example, the input control assembly 1202 can include a sensor 1208 configured to detect a position of the lever 1204. The sensor 1208 can be at least partially enclosed within a housing 1210 of the input control assembly 1202. The sensor 1208 can generate a signal indicating a position of the lever 1204 and/or send the signal to another component of a lawn mower. As noted above, the lever 1204 can include multiple tabs 1204(1)-1204(4) that extend from and rotate around an axis. The sensor 1208 can detect the amount of rotation around the axis.

In some examples, the input control assembly 1202 can additionally, or alternatively, include a coupling component/feature configured to attach the input control assembly 1202 to a handle to facilitate vertical rotation of the lever 1204 (e.g., around a vertical axis), similar to one or more of the other vertical implementations discussed herein. As such, in some cases, the input control assembly 1202 can be configured for both vertical and horizontal implementations depending on the orientation that the input control assembly 1202 is mounted.

The above description is not intended to be exhaustive or to limit the disclosure to the precise form disclosed above. While specific examples are described above for illustrative purposes, various equivalent modifications are possible within the scope of the disclosure, as those skilled in the relevant art will recognize. For example, while processes or blocks are presented in a given order, alternative examples may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel and/or at different times.

It should be understood that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to any other element, but rather may generally distinguish the element from another element having a similar or identical name (but for use of the ordinal term). In addition, as used herein, articles ("a" and "an") may indicate "one or more" rather than "one." Further, an operation performed "based on" a condition or event may also be performed based on one or more other conditions or events not explicitly recited. In some contexts, description of an operation or event as occurring or being performed "based on," or "based at least in part on," a stated event or condition can be interpreted as being triggered by or performed in response to the stated event or condition.

With respect to the various methods and processes disclosed herein, although certain orders of operations or steps are illustrated and/or described, it should be understood that the various steps and operations shown and described may be performed in any suitable or desirable temporal order. Furthermore, any of the illustrated and/or described operations or steps may be omitted from any given method or process, and the illustrated/described methods and processes may include additional operations or steps not explicitly illustrated or described.

It should be appreciated that in the above description, various features are sometimes grouped together in a single example, figure, or description thereof for the purpose of streamlining the disclosure and aiding in the understanding of one or more of the various aspects of the disclosure. This method of disclosure, however, is not to be interpreted as reflecting an intention that any claim require more features than are expressly recited in that claim. Moreover, any components, features, or steps illustrated and/or described in a particular example herein can be applied to or used with any other example(s). Further, no component, feature, step, or group of components, features, or steps are necessary or indispensable for each example. Thus, it is intended that the scope of the disclosure should not be limited by the particular examples described above.

The one or more example discussed herein are used herein to illustrate one or more aspects, one or more features, and/or one or more concepts. A physical embodiment of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same, related, or unrelated reference numbers. The relevant features, elements, functions, operations, modules, etc. may be the same or similar functions or may be unrelated.

Example Clauses

Example A: An autonomous lawn mower comprising: a first wheel; a control interface including: a handle; and a first input control assembly coupled to the handle, the first input control assembly including a lever and a sensor configured to detect a position of the lever, the lever including a first tab configured to be manipulated by a first finger of a first hand of a user to cause the lever to move in a first direction, and a second tab configured to be manipulated by a second finger of the first hand of the user to cause the lever to move in a second direction; and processing circuitry communicatively coupled to the control interface and configured to: receive a signal from the sensor; and cause the first wheel to move based at least in part on the signal.

Example B: The autonomous lawn mower of Example A, further comprising: a second wheel; wherein the control interface further includes: a second input control assembly coupled to the handle, the second input control assembly including an lever and a sensor configured to detect a position of the lever, the lever of the second input control assembly including a first tab configured to be manipulated by a first finger of a second hand of the user to cause the lever to move in the first direction, and a second tab configured to be manipulated by a second finger of the second hand of the user to cause the lever to move in the second direction, and wherein the processing circuitry is further configured to: receive a signal from the sensor of the second input control assembly; and cause the second wheel to move based at least in part on the signal from the sensor of the second input control assembly.

Example C: The autonomous lawn mower of Example A or B, wherein the lever is configured to rotate around an axis, the first direction being a first rotational direction and the second direction being a second rotational direction.

Example D: The autonomous lawn mower any of Examples A through C, wherein the sensor is configured to detect an amount of rotation of the lever around the axis, and the signal indicates the amount of rotation of the lever.

Example E: The autonomous lawn mower of any of Examples A through D, wherein the signal indicates the position of the lever, and the processing circuitry is configured to cause the first wheel to move at a speed that is associated with the position.

Example F: The autonomous lawn mower of any of Examples A through E, wherein the processing circuitry is configured to: control the autonomous lawn mower based at least in part on configuration data that indicates a first action for input received via the first input control assembly, the first action including controlling a speed of the first wheel; receive user input data indicating a second action for input received via the first input control assembly; and reconfigure the configuration data to associate the second action with the first input control assembly, the second action including at least one of controlling a speed of both the first wheel and a second wheel, controlling a speed of a blade assembly of the autonomous lawn mower, or controlling a height of the blade assembly.

Example G: The autonomous lawn mower of any of Examples A through F, wherein the first input control assembly is configured to bias the lever to a first position that is associated with an idle state of the first wheel.

Example H: The autonomous lawn mower of any of Examples A through G, wherein the first input control assembly further includes a speed selector located proximate to the first input control assembly, and wherein the processing circuitry is further configured to: receive an additional signal from the speed selector; and set a maximum speed for the autonomous lawn mower based at least in part on the additional signal from the speed selector.

Example I: A lawn mower comprising: a first wheel; an input control assembly including a lever and a sensor configured to detect a position of the lever, the lever including a first control and a second control disposed in an opposing manner, the first control being configured to be manipulated by a first finger and the second control being configured to be manipulated by a second finger; a speed selector located proximate to the input control assembly; and processing circuitry communicatively coupled to the control assembly and configured to: receive a first signal from the speed selector; set a maximum speed for the lawn mower based at least in part on the first signal; receive a second signal from the sensor; and cause the first wheel to move based at least in part on the first signal and the maximum speed.

Example J: The lawn mower of Example I, wherein the first finger is an index finger and the second finger is a thumb.

Example K: The lawn mower of Example I or J, wherein the processing circuitry is configured to: implement a manual control mode in which the input control assembly is enabled to control the lawn mower; and implement an autonomous mode in which the input control assembly is disabled from controlling the lawn mower and the lawn mower moves in an autonomous manner.

Example L: The lawn mower of any of Examples I through K, wherein the lever is configured to rotate around an axis, and the sensor is configured to detect an amount of rotation of the lever around the axis, the signal indicating the amount of rotation of the lever.

Example M: The lawn mower of any of Examples I though L, wherein the processing circuitry is configured to cause the lawn mower to move at a speed that is associated with the amount of rotation.

Example N: The lawn mower of any of Examples I through M, further comprising: a second wheel; wherein the processing circuitry is further configured to: determine a condition of the lawn mower, the condition including at least one of: a loss in traction of the second wheel on a surface; a difference in speed of the first wheel relative to the second wheel when the same torque values are applied to drive the first and second wheels; a difference in tire pressure between the first wheel and the second wheel; or the lawn mower traveling on an incline; and automatically adjust an amount of torque applied to the first wheel.

Example O: The lawn mower of any of Examples I through N, wherein the control interface is configured to couple to a user device that stores an identifier, the user device including at least one of a portable device or a Radio-Frequency Identification (RFID) device, wherein the processing circuitry is configured to: determine an identity of the user based at least in part on the user identifier; and load user preferences associated with the user for operation of the lawn mower by the user.

Example P: The lawn mower of any of Examples I though O, further comprising: a display configured to display training data indicating how to operate the lawn mower; wherein the processing circuitry is further configured to: detect one or more parameters regarding operation of the lawn mower; identify one or more suggestions for operating the lawn mower, the one or more suggestions being based at least in part on the one or more parameters; and cause the display to present the one or more suggestions.

Example Q: The lawn mower of any of Examples I through P, wherein the processing circuitry is further configured to: detect an unsafe condition; and perform one or more emergency operations including at least one of: causing the lawn mower to brake at a rate that is above a threshold; causing the lawn mower to change a trajectory; or causing a blade assembly to be raised.

Example R: An input control assembly for a lawn mower, the input control assembly comprising: a lever including: a first tab configured to be manipulated by a first finger of a first hand of a user to cause the lever to move in a first direction; and a second tab configured to be manipulated by a second finger of the first hand of the user to cause the lever to move in a second direction; and a sensor configured to detect a position of the lever and send a signal to processing circuitry of the lawn mower indicating the position of the lever.

Example S: The input control assembly of Example R, further comprising: at least one of a magnet or a spring configured to bias the lever to a position that is associated with an idle state of the autonomous lawn mower.

Example T: The input control assembly of Example R or S, wherein: the input control assembly further comprises a speed selector located proximate the lever and configured to generate an additional signal, the input control assembly is coupled to the lawn mower, and the signal, when received by the lawn mower, configures the lawn mower to move at a speed based at least in part on the additional signal.

What is claimed is:

1. An autonomous lawn mower comprising:
a first wheel;
a control interface including:
  a handle; and
  a first input control assembly coupled to the handle, the first input control assembly including a lever and a sensor configured to detect a position of the lever, the lever including a first tab configured to be manipulated by a first finger of a first hand of a user to cause the lever to move in a first direction, and a second tab configured to be manipulated by a second finger of the first hand of the user to cause the lever to move in a second direction; and
processing circuitry communicatively coupled to the control interface and configured to:
  receive a signal from the sensor; and
  cause the first wheel to move based at least in part on the signal.

2. The autonomous lawn mower of claim 1, further comprising:
a second wheel;
wherein the control interface further includes:
  a second input control assembly coupled to the handle, the second input control assembly including an lever and a sensor configured to detect a position of the lever, the lever of the second input control assembly including a first tab configured to be manipulated by a first finger of a second hand of the user to cause the lever to move in the first direction, and a second tab configured to be manipulated by a second finger of the second hand of the user to cause the lever to move in the second direction, and wherein the processing circuitry is further configured to:
  receive a signal from the sensor of the second input control assembly; and
  cause the second wheel to move based at least in part on the signal from the sensor of the second input control assembly.

3. The autonomous lawn mower of claim 1, wherein the lever is configured to rotate around an axis, the first direction being a first rotational direction and the second direction being a second rotational direction.

4. The autonomous lawn mower of claim 3, wherein the sensor is configured to detect an amount of rotation of the lever around the axis, and the signal indicates the amount of rotation of the lever.

5. The autonomous lawn mower of claim 1, wherein the signal indicates the position of the lever, and the processing circuitry is configured to cause the first wheel to move at a speed that is associated with the position.

6. The autonomous lawn mower of claim 1, wherein the processing circuitry is configured to:
control the autonomous lawn mower based at least in part on configuration data that indicates a first action for input received via the first input control assembly, the first action including controlling a speed of the first wheel;
receive user input data indicating a second action for input received via the first input control assembly; and
reconfigure the configuration data to associate the second action with the first input control assembly, the second action including at least one of controlling a speed of both the first wheel and a second wheel, controlling a speed of a blade assembly of the autonomous lawn mower, or controlling a height of the blade assembly.

7. The autonomous lawn mower of claim 1, wherein the first input control assembly is configured to bias the lever to a first position that is associated with an idle state of the first wheel.

8. The autonomous lawn mower of claim 1, wherein the first input control assembly further includes a speed selector located proximate to the first input control assembly, and
wherein the processing circuitry is further configured to:
  receive an additional signal from the speed selector; and
  set a maximum speed for the autonomous lawn mower based at least in part on the additional signal from the speed selector.

9. A lawn mower comprising:
a first wheel;
an input control assembly including a lever and a sensor configured to detect a position of the lever, the lever including a first control and a second control disposed in an opposing manner, the first control being configured to be manipulated by a first finger and the second control being configured to be manipulated by a second finger;

a speed selector located proximate to the input control assembly; and processing circuitry communicatively coupled to the input control assembly and configured to:
   receive a first signal from the speed selector;
   set a maximum speed for the lawn mower based at least in part on the first signal;
   receive a second signal from the sensor; and
   cause the first wheel to move based at least in part on the first signal and the maximum speed.

10. The lawn mower of claim 9, wherein the first finger is an index finger and the second finger is a thumb.

11. The lawn mower of claim 9, wherein the processing circuitry is configured to:
   implement a manual control mode in which the input control assembly is enabled to control the lawn mower; and
   implement an autonomous mode in which the input control assembly is disabled from controlling the lawn mower and the lawn mower moves in an autonomous manner.

12. The lawn mower of claim 9, wherein the lever is configured to rotate around an axis, and the sensor is configured to detect an amount of rotation of the lever around the axis, the second signal indicating the amount of rotation of the lever.

13. The lawn mower of claim 12, wherein the processing circuitry is configured to cause the lawn mower to move at a speed that is associated with the amount of rotation.

14. The lawn mower of claim 9, further comprising:
   a second wheel;
   wherein the processing circuitry is further configured to:
      determine a condition of the lawn mower, the condition including at least one of:
         a loss in traction of the second wheel on a surface;
         a difference in speed of the first wheel relative to the second wheel when the same torque values are applied to drive the first and second wheels;
         a difference in tire pressure between the first wheel and the second wheel; or
         the lawn mower traveling on an incline; and
      automatically adjust an amount of torque applied to the first wheel.

15. The lawn mower of claim 9, wherein the lawn mower is configured to couple to a user device that stores an identifier, the user device including at least one of a portable device or a Radio-Frequency Identification (RFID) device, wherein the processing circuitry is configured to:
   determine an identity of a user based at least in part on the identifier; and
   load user preferences associated with the user for operation of the lawn mower by the user.

16. The lawn mower of claim 9, further comprising:
   a display configured to display training data indicating how to operate the lawn mower;
   wherein the processing circuitry is further configured to:
      detect one or more parameters regarding operation of the lawn mower;
      identify one or more suggestions for operating the lawn mower, the one or more suggestions being based at least in part on the one or more parameters; and
      cause the display to present the one or more suggestions.

17. The lawn mower of claim 9, wherein the processing circuitry is further configured to:
   detect an unsafe condition; and
   perform one or more emergency operations including at least one of:
      causing the lawn mower to brake at a rate that is above a threshold;
      causing the lawn mower to change a trajectory; or
      causing a blade assembly to be raised.

* * * * *